(12) United States Patent
Yamaguchi

(10) Patent No.: US 6,721,254 B1
(45) Date of Patent: Apr. 13, 2004

(54) DRIVE DEVICE

(75) Inventor: Shigeo Yamaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/548,407

(22) Filed: Apr. 13, 2000

(30) Foreign Application Priority Data

Apr. 14, 1999 (JP) .......................................... P11-106453

(51) Int. Cl.[7] .............................. G11B 7/00; G11B 20/18
(52) U.S. Cl. .............................. 369/53.35; 369/53.27; 369/53.22; 369/53.1; 369/47.5; 369/47.15; 369/116
(58) Field of Search ................................ 369/100, 116, 369/121, 59.1, 47.5, 47.15, 53.1, 53.22, 53.27, 53.35; 360/39, 40

(56) References Cited

U.S. PATENT DOCUMENTS

| | | | | | |
|---|---|---|---|---|---|
| 4,403,318 A | * | 9/1983 | Nagashima et al. | ........ | 369/100 |
| 5,450,389 A | * | 9/1995 | Hayashi | .................... | 369/59.15 |
| 5,469,415 A | * | 11/1995 | Fujita et al. | ............. | 369/47.17 |
| 5,517,476 A | * | 5/1996 | Hayashi | .................... | 369/59.22 |
| 5,689,488 A | * | 11/1997 | Yamaguchi | .............. | 369/47.19 |
| 5,748,593 A | * | 5/1998 | Tanaka et al. | ........... | 369/59.19 |
| 5,872,666 A | * | 2/1999 | Saiki et al. | .................... | 360/46 |

* cited by examiner

*Primary Examiner*—David Hudspeth
*Assistant Examiner*—Natalia Figueroa
(74) *Attorney, Agent, or Firm*—Oblon, Spivak, McClelland, Maier & Neustadt, P.C.

(57) ABSTRACT

A drive device having an improved capability of reproducing data is disclosed. If an error occurs during a reproducing operation, reproduction is retried after changing amplitude reference values depending on whether the recording laser power is adequate. This makes it possible for the retrying operation to successfully read data that the previous reproducing operation failed to correctly read owing to an inadequate recording laser power. The determination as to whether the recording laser power is adequate is performed on the basis of the degree of asymmetry of the waveform of a data signal read by head means.

7 Claims, 19 Drawing Sheets

FIG. 11

| sm[k+n-1] | sm[k+n] | DECODED DATA VALUE |
|---|---|---|
| 00 | 00 | 0 |
| 00 | 01 | 1 |
| 01 | 11 | 0 |
| 11 | 11 | 0 |
| 11 | 10 | 1 |
| 10 | 00 | 0 |

FIG. 12

| sm[k+n-1] | sm[k+n] | c i j k |
|---|---|---|
| 00 | 00 | c 0 0 0 |
| 00 | 01 | c 0 0 1 |
| 01 | 11 | c 0 1 1 |
| 11 | 11 | c 1 1 1 |
| 11 | 10 | c 1 1 0 |
| 10 | 00 | c 1 0 0 |

DRIVE DEVICE

BACKGROUND OF THE INVENTION

1. Field of the Invention

The present invention relates to a drive device capable of reproducing data from a recording medium.

2. Description of the Related Art

In drive devices for reproducing data from a recording medium such as an optical disk or a magneto-optical disk, when a certain sector (unit of data recorded on a recording medium) is read, there is a possibility that a decoding error occurs for that sector. One possible cause for that is an inadequate level of laser power used to record data into that sector.

In general optical disk systems, the recording laser power is set to an adequate level depending on a medium used and the conditions of the drive device. In order to determine the optimum level of the recording laser power, calibration is performed when data is recorded.

However, in practice, data is not always recorded with optimum recording laser power even when calibration is performed.

For example, calibration is performed as follows. First, test recording is performed upon a certain region of a medium, and then the recorded data is reproduced. If the test recording reveals that the data was not recorded adequately, the recording laser power is adjusted. However, if the recording sensitivity of regions where data is actually recorded is different from that of the region used in the calibration, the recording laser power determined by the calibration is not optimum in the actual recording operation.

A similar problem also occurs when calibration is performed in an incorrect manner for some reason, or when the recording laser power is not correctly set to the level determined by the calibration.

In some cases, when data is recorded in a certain sector, the data recorded in that sector is immediately reproduced to check whether the data has been recorded correctly. This operation is called a write and verify operation. If it is determined in a verify process that data was not recorded adequately due to an inadequate level of the recording laser power, a recording operation may be retried after setting the recording laser power to an adequate level. However, in some drive devices, the write and verify operation is not performed for all data sectors. Besides, there are many drive devices which do not perform the write and verify process.

For the above reasons, the recording laser power is not necessarily adequate for all data to be reproduced. As a result, a reproduction error can occur owing to an inadequate recording power level.

If a drive device has a high reading ability, there is a possibility that the drive device can correctly reproduce data which has been recorded with inadequate recording laser power. For example, drive devices employing the Viterbi decoding method, which is now practically used in the art, have considerably higher reading ability than those based on the bit-by-bit reading technique.

In the Viterbi decoding method, decoding is performed on the basis of amplitude reference values as will be described in detail later. A method has been developed to adaptively modify the amplitude reference values depending on the signal being reproduced. This method allows a further improvement in the reading ability.

That is, this method allows data to be correctly reproduced by adaptively modifying the amplitude reference values depending on the RF signal being reproduced, even for data recorded with inadequate recording laser power.

However, if the deviation of the recording laser power from the optimum value is too great, the adaptation of the amplitude reference values is impossible, and thus it becomes impossible to correctly reproduce data. More specifically, in a region near the leading end of a sector being reproduced, the amplitude reference values have not been well adapted yet, and thus there is a rather high probability that the amplitude reference values deviate greatly from the values optimum for the RF signal being reproduced. Such a deviation often results in a sector decoding error.

SUMMARY OF THE INVENTION

In view of the above problems, it is an object of the present invention to provide a drive device employing the Viterbi decoding method and capable of correctly reproducing even data recorded with inadequate recording laser power.

According to an aspect of the present invention, there is provided a drive device comprising: head means for reading a data signal recorded on a recording medium by illuminating the recording medium with a laser beam; decoding means for performing a Viterbi decoding process and a predetermined decoding process upon the data signal read by the head means thereby obtaining reproduced data; determining means for determining, from the data signal read by the head means, whether or not the recording laser power used to record the data signal is adequate; and control means for controlling a reproducing operation such that when the decoding means fails to correctly reproduce data from the data signal read by the head means (that is, when a decoding error occurs), if the determining means determines that the recording laser power associated with that data signal is inadequate, the reproducing operation is retried after changing an amplitude reference value used in the Viterbi decoding process.

That is, when a decoding error occurs, if the determining means determines that the recording laser power is inadequate, the retrying of the reproducing operation is performed after changing the amplitude reference value so that even the data recorded with inadequate recording laser power can be successfully reproduced.

Preferably, the determining means calculates the degree of asymmetry of the waveform of the data signal read by the head means and determines the adequacy of the recording laser power on the basis of the degree of asymmetry.

More specifically, the determining means preferably determines the adequacy of the recording laser power depending on whether or not the calculated degree of asymmetry is within a predetermined range.

Because there is a correlation between the degree of asymmetry of the reproduced RF signal and the recording laser power, the recording laser power can be estimated on the basis of the degree of asymmetry, and the retrying operation can be performed in a proper fashion depending on the estimated recording laser power (by adaptively changing the amplitude reference value depending on the recording laser power).

Various types of recordable disk media are known in the art. One type of such a disk medium is a WORM (write-once, read-many-times) disk. The WORM disk can be further categorized into an ablative-type WORM disk in which embossed pits is formed on a disk by means of illumination of a laser beam, a phase transition disk, and an alloy-type disk in which pits are formed such that they have reflectance different from that of non-pit portions.

Another type of recordable disk medium is a rewritable disk medium which can be further categories into a magneto-optical (MO) disk in which magnetic pits are formed, and a disk using phase transitions such as a DVD-RAM and a DVD-RW.

The disk media described above have a correlation between recording laser power and the degree of asymmetry of a reproduced data signal, except for the alloy-type WORM disk. Therefore, it is possible to determine, on the basis of the degree of asymmetry of the reproduced data signal, whether or not the recording laser power is adequate.

Preferably, the control means controls the reproducing operation such that when the operation of reproducing data from a region on the recording medium is started immediately after completion of reproducing data from a previous region on the recording medium, the current amplitude reference value is used in the Viterbi decoding process. The region (sector) following the previous region is not necessarily a region which is physically adjacent to the previous region. Herein, the following region refers to a region which is reproduced after the previous region.

A plurality of sectors recorded in one recording operation are very likely to have been recorded with the same level of recording laser power. Therefore, when the recording laser power of a certain sector is determined to be inadequate and an amplitude reference value is changed, if the changed amplitude reference value is employed in the operation of reproducing the next sector, the probability of successfully reproducing that sector is increased.

BRIEF DESCRIPTION OF THE DRAWINGS

FIG. 11 illustrates the operation performed by a merge block of the Viterbi decoder to select a state data value;

FIG. 12 illustrates amplitude reference values which are adaptively changed by the Viterbi decoder;

DESCRIPTION OF THE PREFERRED EMBODIMENT

The present invention is described in further detail below with reference to preferred embodiments. To facilitate an understanding of the embodiments of the invention, the Viterbi decoding method and the configuration of a disk drive having a reproducing system using the Viterbi decoding method are described as listed below before describing the configuration and the operation of preferred embodiments of disk drives.

1. Disk Drive Having Producing System Employing the Viterbi Decoding Method
   1.1 General Configuration of the Disk Drive
   1.2 Viterbi Decoding Process
   1.3 Viterbi Decoder
2. Embodiment of Disk Drive
   2.1 Configuration of the Disk Drive
   2.2 Correlation between the Recording Laser Power and the Degree of Asymmetry
   2.3 Example of Reproducing Process (I)
   2.4 Example of Reproducing Process (II)
   2.5 Modified Embodiments

1. Disk Drive Having Producing System Employing the Viterbi Decoding Method 1.1 General Configuration of the Disk Drive First, a typical example of a disk drive device (recording/reproducing device) including a reproducing system for reproducing data using the Viterbi decoding method is described.

Figure 1:
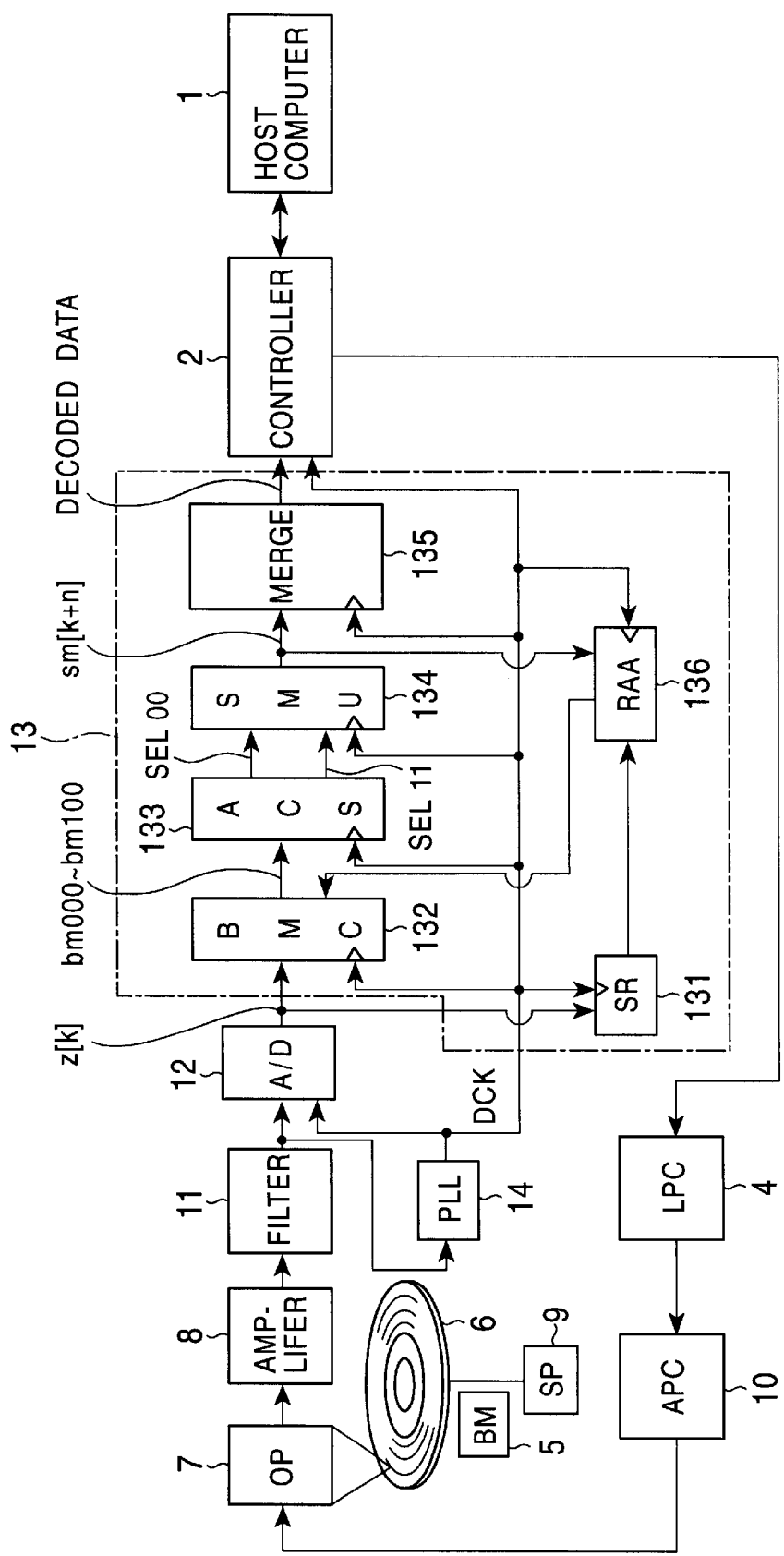
FIG. 1 is a block diagram illustrating a widely used type of disk drive using a Viterbi decoding process, to which the present invention is applicable.

FIG. 1 is a block-diagram illustrating an example of the configuration of a disk drive including a reproducing system for reproducing data from a magneto-optical disk or an optical disk using the Viterbi decoding method. Note that a servo system and other parts which are not essential to the present invention are not shown in FIG. 1.

When data is recorded, in accordance with a command issued by a host computer 1, a controller 2 receives user data to be recorded and encodes an information word of the user data into a codeword such as an RLL(1, 7) code. The codeword is supplied, as data to be recorded, to a laser power controller (hereinafter referred to as an LPC) 4. In addition to the above process, the controller 2 also performs a decoding process which will be described later, controls the operation mode'such as a recording, reproducing, and erasing mode, and communicates with the host computer 1.

In the reproducing/recording/erasing operation, the LPC 4 outputs a laser driving signal (driving pulse) thereby outputting a laser beam from an optical pickup 7.

The drive pulse is supplied to an APC (automatic power controller) and drive unit (hereinafter collectively referred to as an APC) 10. The APC 10 supplies a current corresponding to the drive pulse to a laser diode in an optical pickup 7, which in turn outputs laser power. The APC 10 performs feedback control so that the output laser power is maintained at a predetermined level.

The LPC 4 and the APC 10 control the laser power output from the optical pickup 7 in accordance with the supplied data to be recorded thereby forming a series of pits on a disk 6 being rotated by a spindle motor 9. Thus, data is recorded on the disk 6.

In the case of a drive device for driving a recordable magneto-optical (MO) disk, a series of pits having magnetic polarities is formed on the disk 6. In this case, a magnetic bias field is applied to the disk 6 by a magnetic head 5.

In the case of a disk drive for driving a WORM (write-once, read-many-times) disk of the ablative type, a series of embossed pits is formed by a laser beam.

On the other hand, in the case of a disk drive for driving a WORM (write-once, read-many-times) disk of the alloy type, the reflectance of the recording surface of the disk is modified by a laser beam thereby forming a series of pits.

In the case of a disk drive for driving a phase change disk, a series of phase change pits is formed by a laser beam.

The series of pits is formed by means of mark edge recording method according to a pre-coded signal generated from recorded data, as will be described later.

Figure 2:
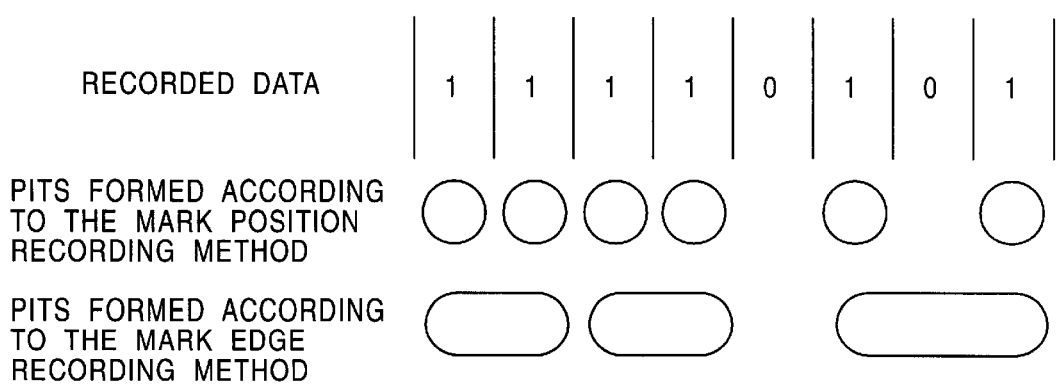
FIG. 2 is a schematic diagram illustrating a mark position recording method and a mark edge recoding method.

The pits are formed such that each pit corresponds to a bit in the pre-coded signal generated according to the recorded data, as described below with reference to FIG. 2.

In a recording method called "mark position recording", a pit is formed for example in correspondence to a "1" in a pre-coded signal and no pit is formed for a "0".

On the other hand, in a recording method known as "mark edge recording", inversion in polarity at an edge of each pit is used to represent for example a "1" in the pre-coded signal. In the reproducing operation, the edge of each pit in a signal being reproduced is detected in accordance with a read clock DCK which is generated in a manner described later.

The reproducing system shown in FIG. 1 operates as follows.

A laser beam output from the optical pickup 7 falls upon the disk 6 being rotated by the spindle motor 9. The optical pickup 7 detects light reflected from the disk 6 and generates reflected light information. Although not described in detail, the reflected light information includes a reproduced RF signal corresponding to reproduced data, a focus error signal, and a tracking error signal. In the case where the disk sector format includes an area where embossed pits are formed and an area where pits are magneto-optically formed, the reproduced RF signal includes two types of signals, that is, a sum signal and a difference signal, which are dealt with by performing switching depending on the area in a sector.

The gain of the RF signal is adjusted by an amplifier 8, and the resultant RF signal is supplied to a filter 11.

The filter 11 includes a lowpass filter for removing noise and a waveform equalizer for equalizing the waveform of the RF signal. As will be described in further detail later, the waveform equalization characteristic employed in the waveform equalization process is selected to meet the requirements of the Viterbi decoding process performed by the Viterbi decoder 13. The output of the filter 11 is supplied to an analog-to-digital converter 12, which in turn samples the received signal in response to a read clock signal DCK thereby producing a sampled signal value z[k].

The Viterbi decoder 13 produces decoded data from the reproduced signal value z[k] by means of Viterbi decoding method. Thus decoded data is obtained in the form of a series of most likely data corresponding to the data recorded in the above-described manner. When there is no decoding error, the decoded data becomes identical to the recorded data.

The Viterbi decoder 13 includes a branch metric block (BMC) 132, an add/compare/select block (ACS) 133, a status memory unit (SMU) 134, and a merge block 135. These elements will be described later.

The Viterbi decoder 13 also includes a shift register 131 and an amplitude reference value adapting unit (RAA) 136. The output of the analog-to-digital converter 12 is also supplied to the shift register 15. After a predetermined delay of time, the shift register 15 transfers the received data to the amplitude reference value adapting unit (RAA) 136. These operations will be described in further detail later.

The decoded data output from the Viterbi decoder13 is supplied to the controller 2. As described earlier, the recorded data is represented in the form of codewords produced by coding user data by means of channel coding or the like. Therefore, if the decoding error rate is sufficiently low, the decoded data can be regarded as identical to the recorded data represented in the codewords. The controller 2 performs a decoding process, which is an inverse process of the channel coding process, upon the above decoded data thereby reproducing the user data.

The output of the filter 11 is also supplied to a PLL 14. The PLL 14 generates a read clock signal DCK in accordance with the supplied signal. The PLL 14 detects a phase error using a fixed-frequency signal recorded on the magneto-optical disk 6. The generated read clock signal DCK is supplied to the controller 2, the analog-to-digital converter 12, the Viterbi decoder 13, and other circuits elements.

The operations of the controller 2, the analog-to-digital converter 12, and the Viterbi decoder 13 are performed in accordance with the timing specified by the read clock signal DCK.

1.2 Viterbi Decoding Method

The Viterbi decoding process performed by the Viterbi decoder 13 is described below. As described above, user data is recorded after being encoded into codewords according to one of various encoding methods. The coding method is properly selected depending on the properties of a recording medium and the recording/reproducing method.

In the disk drive shown in FIG. 1, an RLL (Run Length Limited) coding method is employed in which block coding is performed such that the number of "0"s between two adjacent "1"s is limited.

The Viterbi decoding method may be employed to decode a signal reproduced from data which has been recoded using a combination of the RLL coding method and the mark edge recording method described above.

The RLL coding method meets the requirements of the high recording density and the high reliability in the reproducing operation. In the mark edge recording method, as described above, each "1" in the pre-coded signal generated in accordance with the recorded data is represented by the polarity inversion at the edge of a pit. Therefore, the number of bits represented by one pit, that is, the recording density can be increased by increasing the number of "0"s between two adjacent "1"s.

On the other hand, the reproduction clock signal DCK used to adjust the timing of the operations of various parts in the reproducing system is generated by the PLL 14 from the reproduced signal as described above. Therefore, if the recorded data includes a large number of "0"s between two adjacent "1"s, the operation of the PLL 14 becomes unstable. The instability of the operation of the PLL 14 results in instability of the overall operation of the reproducing system.

If the above two conditions are taken into account, it is required that the number of "0"s between two adjacent "1"s should not be too large and should not be too small, that is, the number of "0"s should be within a proper range. The RLL coding method is effective to meet the above requirement in terms of the number of "0"s in the recorded data.

Figure 3:
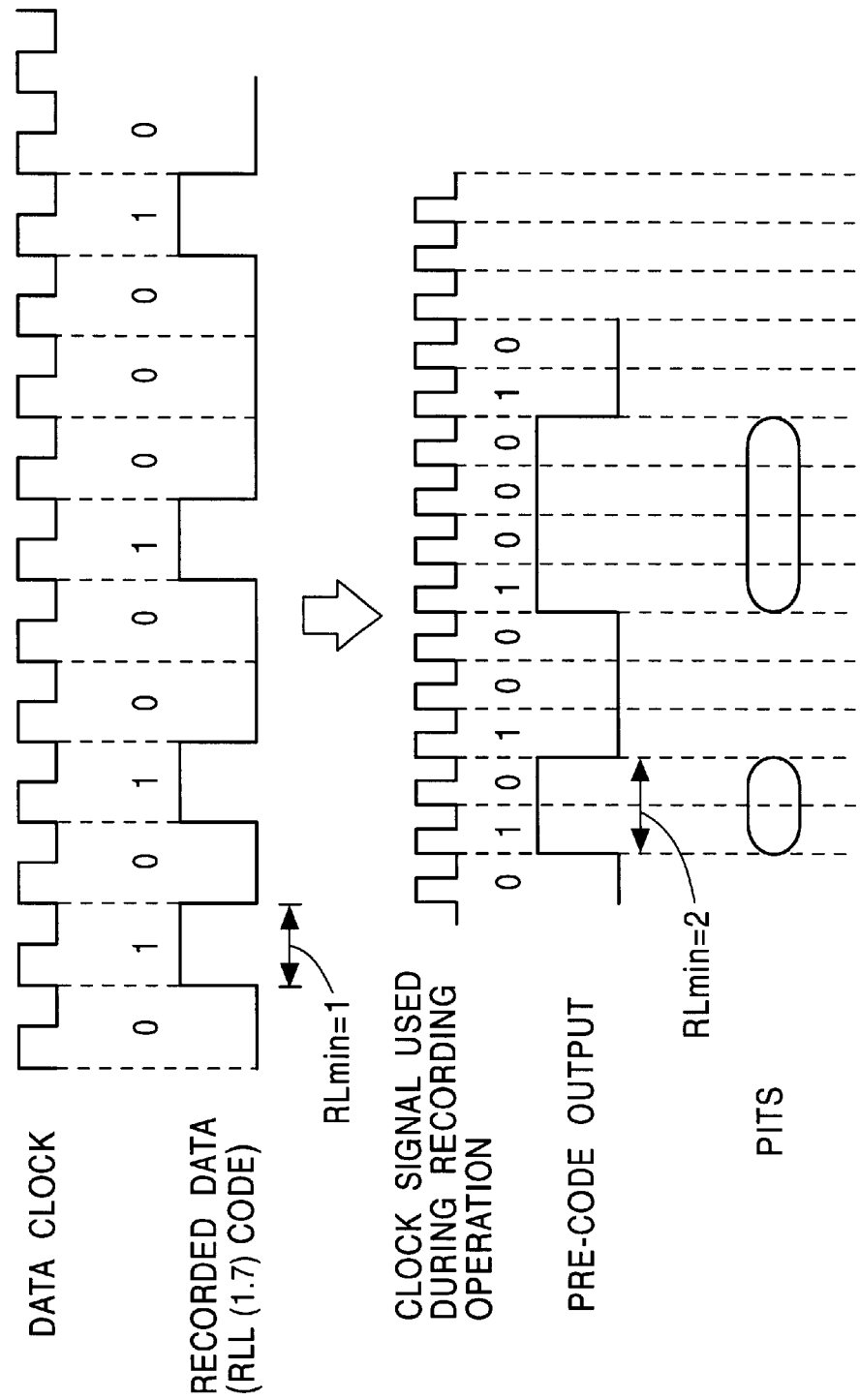
FIG. 3 is a schematic diagram illustrating a minimum magnetic inversion width in an RLL(1, 7) coding process.

In the combination of the RLL(1, 7) coding method and the mark edge recording method, as shown in FIG. 3, at least one "0" appears between two adjacent "1"s in the pre-coded signal generated in accordance with the recorded data, and thus the minimum inversion length (RLmin) becomes 2. In the case where a coding method having a minimum inversion length of 2 is employed, a 4-value 4-state (6-value 4-state) Viterbi decoding process may be used to decode recorded data from a reproduced signal which is affected by intersymbol interference and noise.

As described earlier, the reproduced signal is waveform-equalized by the filter 11. In the waveform equalization process performed as a pre-process before the Viterbi decoding process, a partial response method may be used in which intersymbol interference is used in a positive sense. The waveform equalization characteristic used in this method is determined from partial response characteristics generally represented by $(1+D)^n$ taking into account the track recording density of the recording/reproducing system and the MTF (Modulation Transfer Function).

The PR(1, 2, 1) waveform equalization is performed, as a pre-processing before the 4-value 4-state Viterbi decoding process, on the data recorded by means of the combination of the RLL(1, 7) coding method and the mark edge recording method.

In the mark edge recording method, as shown in FIG. 3, before actually recording data on a magneto-optical disk or the like, pre-coding is performed in accordance with data which is to be recorded and which has been coded by means of the above-described RLL coding or the like. If a series of data to be recorded is given by a[k] where k denotes a point in time, and if a corresponding series of pre-coded data is represented by b[k], then the pre-coding is performed as follows:

$$b[k]=\mathrm{mod}2(a[k]+b[k-1]) \quad (1)$$

The resultant pre-coded data b[k] is actually recorded on the disk 6.

The waveform equalization performed by the waveform equalizer in the filter 11 using the waveform equalization characteristic PR(1, 2, 1) during the operation of reproducing the recorded data is described below. In the following description, it is assumed that the amplitude of the signal is not normalized, and PR(B, 2A, B) is employed as the waveform equalization characteristic. Furthermore, the reproduced signal value containing no noise is represented by c[k], and the actual reproduced signal containing noise (that is, the signal reproduced from the disk 6) is represented by z[k].

When PR(B, 2A, B) is employed, the amplitude of the reproduced signal at a certain point in time k is multiplied by 2A, and the amplitude at the previous point in time k−1 and the amplitude at the following point in time k+1 are multiplied by B, respectively. Therefore, the reproduced signal has a maximum value when a pulse is detected at all points in time k−1, k, and k+1. In this case, the maximum value of the reproduced signal becomes as follows:

$$B+2A+B=2A+2B$$

The minimum value of the reproduced signal is 0. However, in practice, a DC component, that is, A+B is subtracted from c[k] as described below.

$$c[k]=B\times b(k-2)+2A\times b(k-1)+B\times b[k]-A-B \quad (2)$$

Therefore, if noise is not taken into account, the reproduced signal c[k] has one of the following values: A+B, A, −A, −A−B.

Figure 4:
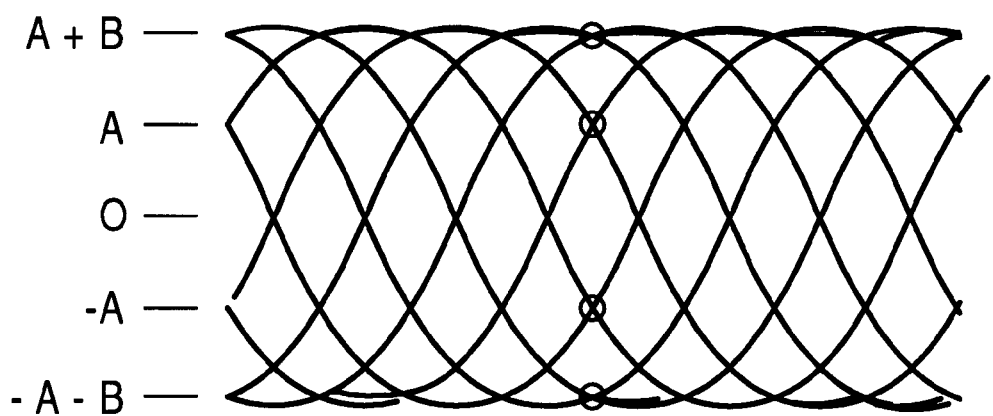
FIG. 4 is a schematic diagram illustrating an eye pattern obtained by performing waveform equalization by means of PR(1, 2, 1) upon a signal reproduced from data recorded by means of RLL(1, 7) coding and mark edge recording.

It is known in the art to use an eye pattern to represent the property of a reproduced signal. The eye pattern is generated by superimposing a large number of reproduced signals for example at five points in time. FIG. 4 illustrates an example of an eye pattern of an actual reproduced signal z[k] subjected to a waveform equalization process according to PR(B, 2A, B) in a recording/reproducing device according to the present invention. It can be seen from FIG. 4 that the value of the reproduced signal z[k] at each point in time is substantially equal to one of values A+B, A, −A, −A−B, although slight deviations due to noise are observed. As will be described later, values A+B, A, −A, −A−B are used as detection points.

After the waveform equalization described above, the reproduced signal is Viterbi-decoded as briefly described below in steps (1)–(3).

Step (1): All possible states allowed in the coding method and the recording medium employed are determined.

Step (2): All possible state transitions from each state at a certain point in time to states at the following point in time are determined. Furthermore, the values of recorded data a[k] and the reproduced signal c[k], corresponding to the respective state transitions, are determined.

Figure 6:
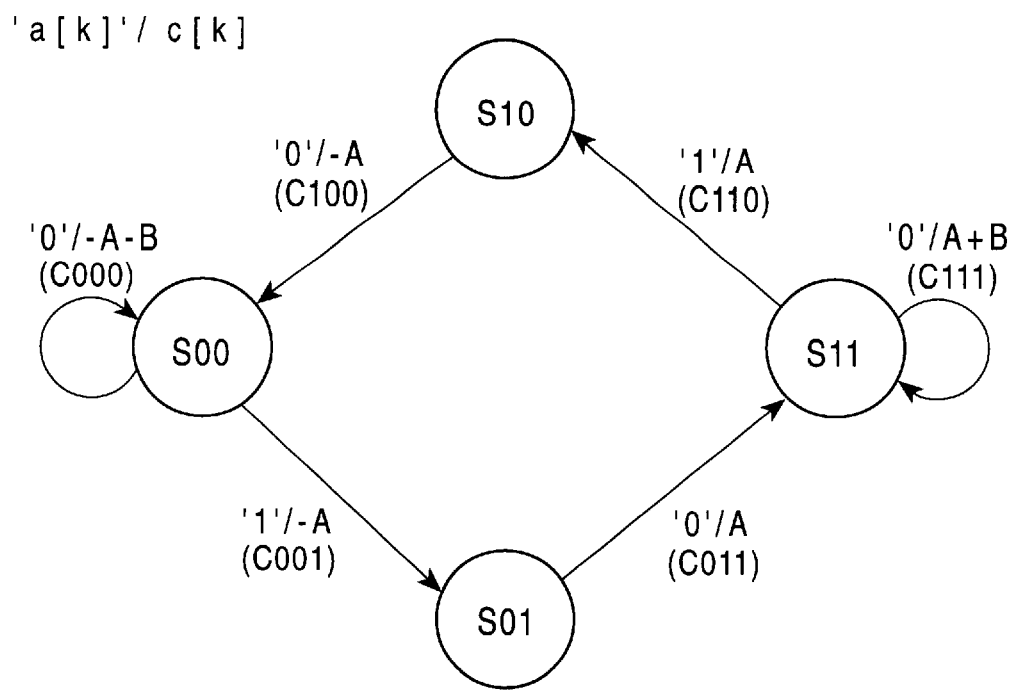
FIG. 6 is a diagram illustrating state transitions in a Viterbi decoding process.

FIG. 6 illustrates, in the form of a state transition diagram, all possible states and state transitions determined in steps (1) and (2) and also illustrates (the value of recorded data a[k])/(the value of the reproduced signal c[k]) corresponding to each transition. The Viterbi decoder 13 is constructed so as to perform the decoding operation represented in this state transition diagram.

Step (3): On the assumption of the possible transitions determined in steps (1) and (2), a most likely state transition is selected for the reproduced signal z[k] reproduced from the recording medium at each point in time k. Note that the reproduced signal z[k] has been waveform-equalized before being supplied to the Viterbi decoder 13, as described above.

Each time a most likely transition is selected, the value of the recorded data d[k] corresponding to the selected state transition is selected as a decoded value, thereby producing decoded data a'[k] in the form of a series of most likely decoded values corresponding to the recorded data.

Alternatively, state data values representing selected state transitions may be produced. In the example shown in FIG. 1, the SMU 134 produces state data in the form of a series of state data values sm[k+n].

Steps (1)–(3) are described in further detail below.

First, step (1) is described. States at respective points in time k are described using pre-coded output values for previous points in time as follows. That is, when n=b[k], m=b[k−1], and l=b[k−2], the state at a point in time k is defined as Snml.

According to the above definition, there are $2^3=8$ possible states. However, in practice, the actually used states are limited depending on the coding method or other factors. In the case of a series of recorded data a[k] coded in RLL(1, 7) codes, at least one "0" is put between two adjacent "1"s, and thus two or more successive "1"s never appear. Such a restriction imposed upon the series of recorded data a[k] restricts the pre-coded output values b[k] and thus restricts the possible states.

The restriction is described in further detail below. As described earlier, two or more successive "1"s never appear in the series of recorded data generated by means of RLL(1, 7) decoding. That is, the following patterns are impossible.

$$a[k]=1,\ a[k-1]=1,\ a[k-2]=1 \quad (3)$$

$$a[k]=1,\ a[k-1]=1,\ a[k-2]=0 \quad (4)$$

$$a[k]=0,\ a[k-1]=1,\ a[k-2]=1 \quad (5)$$

If the above restriction is imposed upon the series of recorded data, b[k] given by equation (1) has a restriction that two states S010 and S101 represented in the form of Snml defined above are impossible. Therefore, the number of possible states becomes $2^3-2=6$.

Step (2) is now described. In order to determine the possible states at a point in time j+1 following a point in time j, it is required to separately examine state transitions for the case where the recorded data value at a point in time j+1 is "1", that is, a[j+1]="1" and for the case where the recorded data value at the point in time j+1 is "0", that is, a[j+1]="0".

By way of example, state S000 is discussed below. State S000, that is, n=b[j]=0, m=b[j−1]=0, and 1=b[j−2]=0 can occur as a result of pre-coding one of the two recoded data described below, according to equation (1).

$$a[j]=0, a[j-1]=0, a[j-2]=1 \quad (6)$$

$$a[j]=0, a[j-1]=0, a[j-2]=0 \quad (7)$$

In the case where a[j+1]=1, b[j+1] can be calculated according to equation (1) as follows:

$$b[j+1]=\mod2(a[j+1]+b[j])=\mod2(1+0)=1 \quad (8)$$

Thus, the value of the reproduced signal c[j] is calculated according to equation (2) as follows:

$$c[j+1]=B \times b[j+1]+2A \times b[j]+B \times b[j-1]-A-B=B \times 1+2A \times 0+B \times 0-A-B=-A \quad (9)$$

At the following point in time [j+1], the state Snml becomes n=b[j+1], m=b[j], and 1=b[j−1]. Herein, b[j+1]=1, b[j]=0, and b[j−1]=0 as described above, and thus the state at the point in time j+1 becomes S100. Therefore, when a[j+1]=1, it can be concluded that a transition occurs such that S000→S100.

In the case where a[j+1], b[j+1] can be calculated according to equation (1) as follows:

$$b[j+1]=\mod2(a[j+1]+b[j])=\mod2(0+0)=0 \quad (10)$$

Therefore, the value of the reproduced signal c[j+1] is calculated according to equation (2) as follows:

$$c[j+1]=(B \times b[j+1]+2A \times bj]+B \times b[j-1])-A-B=(B \times 0+2A \times 0+B \times 0)-A-B=-A-B \quad (11)$$

State Snml at the point in time j+1 becomes such that n=b[j+1], m=b[j], and 1=b[j−1]. Herein, because b[j+1]=0, b[j]=0, and b[j−1]=0 as described above, the state at this point in time becomes S000. Thus, when a[j+1]=0, a transition occurs such that S000→S000.

For states other than S000 at the point in time j, transitions to possible states at the following point in time j+1 can be determined in a similar manner as described above. Furthermore, the correspondence between the recorded data value a[j+1] and the reproduced signal value c[j+1] can be determined for each of the possible transitions.

Figure 5:
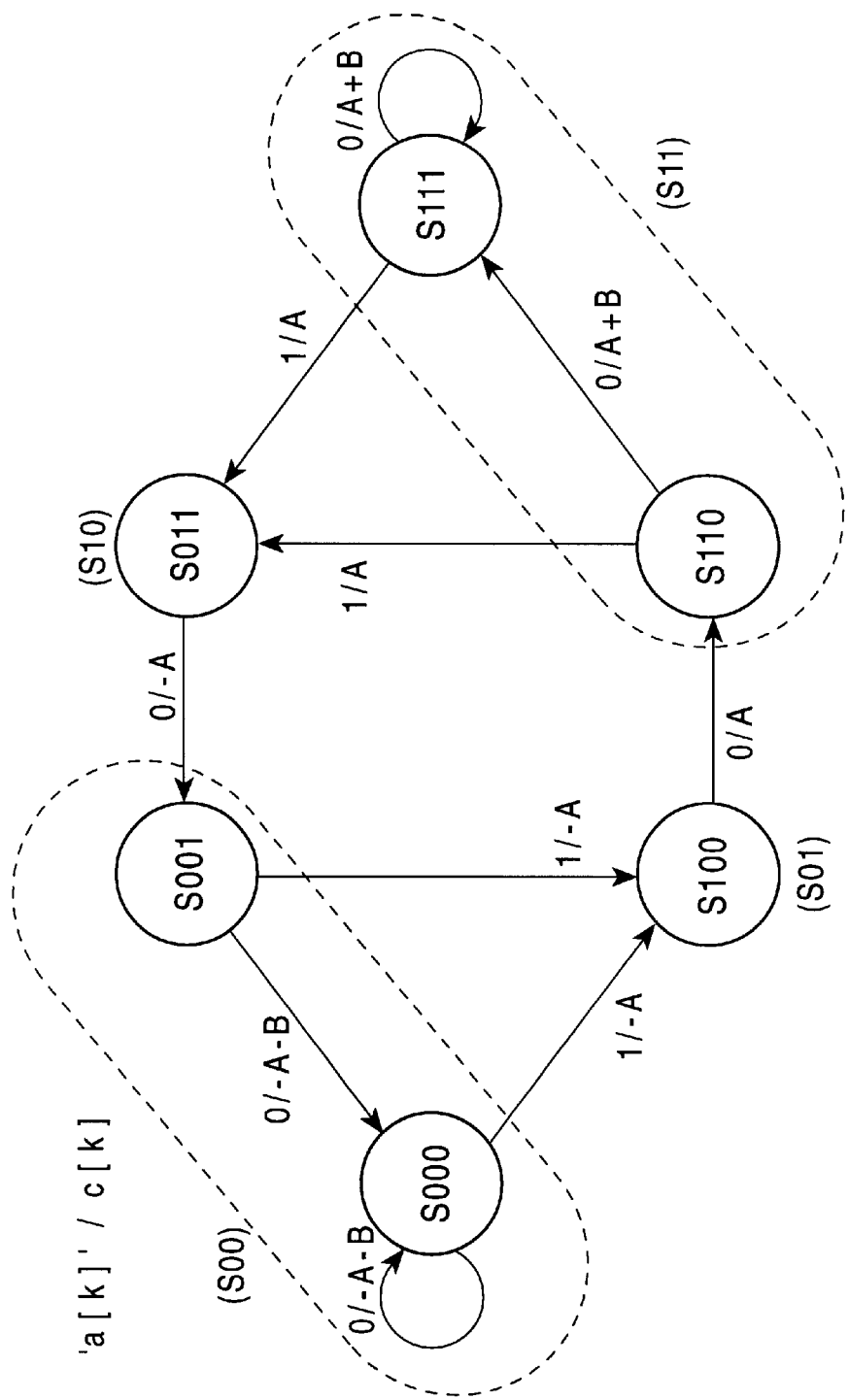
FIG. 5 is a diagram illustrating state transitions in a Viterbi decoding process.

FIG. 5 illustrates, in the form of a state transition diagram, transitions from respective states to possible states and the recorded data values and the reproduced signal values corresponding to the respective transitions. In the above discussion, points in time j and j+1 are not limited to particular points. The possible state transitions and the correspondence between the recorded data value and the reproduced signal value associated with the state transitions may be applied to any point in time. In FIG. 5, the value of recorded data and the corresponding value of the reproduced signal associated with a state transition at an arbitrary point in time k is represented by a[k] and c[k], respectively.

In FIG. 5, state transitions are represented by arrows. On a side of each arrow, the corresponding values of the recorded data a[k] and the reproduced signal c[k] are represented in the form of "a[k]/c[k]". Each of states S000, S001, S111, and S110 has two transition paths to next states. In contrast, states S011 and S100 each have only one path to a next state.

Furthermore, in FIG. 5, when a[k]=1, both states S000 and S001 go to state S100 and the corresponding value of c[k] becomes −A. On the other hand, when a[k]=0, both sates S000 and S001 go to state S000, and the corresponding value of c[k] becomes −A−B.

Similarly, both states S111 and S110 have the same value, c[k+1], f or the same value of a [k+1], and go to the same state. Therefore, S000 and S001 can be collectively represented as S00, and S111 and S110 can be collectively represented as S11. Furthermore, if S011 and S100 are rewritten as S10 and S01, respectively, then the state transition diagram shown in FIG. 5 can be represented as shown in FIG. 6.

That is, FIG. 6 is a diagram illustrating state transitions employed in the 4-value 4-state Viterbi decoding process.

In the case where there are four states as in the 4-value 4-state Viterbi decoding process, these four states can be represented using 2 bits. Thus, 2-bit data can be used as state data. In FIG. 6, states are represented as S00, S01, S11, and S10 using 2-bit state data values 00, 01, 11, and 10, respectively.

Figure 7:
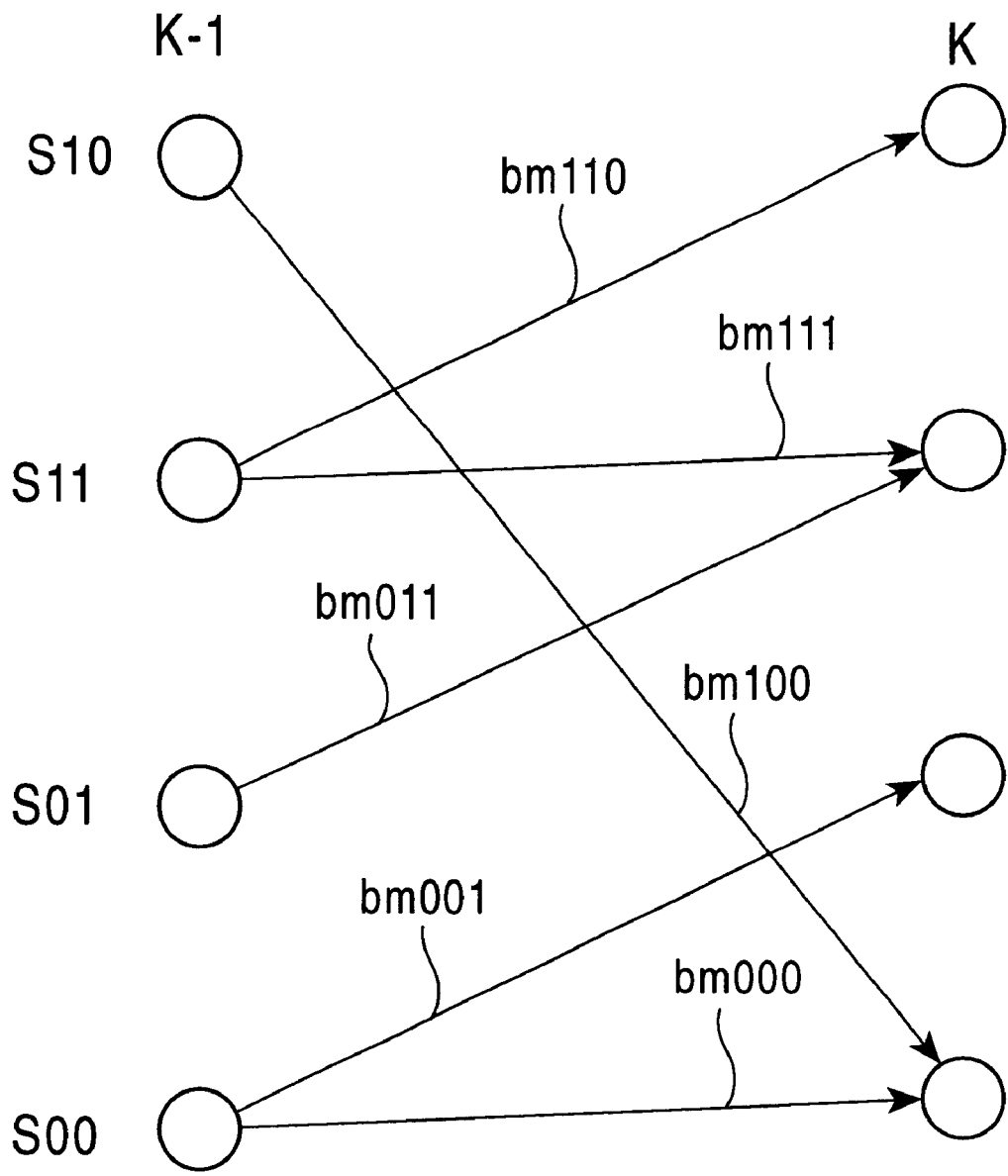
FIG. 7 a trellis diagram illustrating state transitions in a Viterbi decoding process.

The state transitions shown in FIG. 6 may also be represented in the form of a trellis diagram as shown in FIG. 7, in which passage of time is represented by a flow in a horizontal direction and state transitions are represented as a function of passage of time. Although the trellis diagram shown in FIG. 7 represents possible transitions between two points in time, it is also possible to represent transitions for a greater number of points in time. With the passage of time, the locations in the trellis diagram go to right. Therefore, arrows extending in a horizontal direction denote transitions from a certain state to the same state as is the case with a transition S00→S00. On the other hand, arrows extending in a diagonal direction represent transitions from a state to a different state as is the case with a transition S01→S11.

In the above-described step (3) in the Viterbi decoding process according to the state transition diagram shown in FIG. 6, a most likely state transition for a given actual reproduced signal z[k] containing noise may be selected as follows.

In order to select a most likely state transition, it is required to calculate the sums of likelihood values of all transitions in paths to a state at a point in time k through a plurality of points in time, and then compare the calculated sums of likelihood values to select a series of most likelihood decoded data. The sum of likelihood values is referred to as a path metric.

In order to calculate the path metric, it is required to first calculate the likelihood value of a transition between two adjacent points in time. The likelihood value for such a transition can be calculated from the reproduced signal values z[k] in accordance with the state transition diagram described above, as follows. First, a general case is discussed in which a state Sa is given at a point in time k−1. If a reproduced signal z[k] is input to the Viterbi decoder 13, the Viterbi decoder 13 calculates the likelihood value associated with a transition to a state Sb according to an equation described below. Herein, it is assumed that each of states Sa and Sb be one of four states shown in the state transition diagram in FIG. 7.

$$(z[k]-c(Sa, Sb))^2 \quad (12)$$

In equation (12), c(Sa, Sb) denotes a reproduced signal value corresponding to a transition from state Sa to state Sb shown in the state transition diagram in FIG. 6. For example, in the case of a transition from S00 to S01, the corresponding reproduced signal-value is obtained as −A as shown in FIG. 6. Thus, equation (12) represents the Euclidean distance between the actual reproduced signal value z[k] containing noise and the reproduced signal c(Sa, Sb) calculated without taking noise into account. The path metric at a certain point in time is given as the sum of likelihood values associated with transitions between all adjacent points in time before reaching that point in time.

1.3 Viterbi Decoder

In the Viterbi decoder 13, the BMC 132, the ACS 133, and the SMU 134 detect state data corresponding to state transitions which occur in the above-described manner, and the merge block 135 performs decoding in accordance with the detected state data. The resultant decoded data is supplied to the controller 2.

The configuration and the operation of the Viterbi decoder 13 are described below.

In the following description, it is assumed that PR($\alpha$, $\beta$, $\gamma$) be employed as the waveform equalization characteristic, instead of PR(B, 2A, B). This assumption is made because it is difficult to obtain an ideal partial response characteristic in practical disk drives, and thus the waveform equalization characteristic often becomes asymmetric.

Causes of the difficulty in obtaining the ideal partial response characteristic are a limitation of the operation accuracy of the waveform equalizer, asymmetry (in waveform) due to a large deviation of the recording laser power from an optimum value, and a phase error of the read clock signal used by the analog-to-digital converter 12 to sample the reproduced signal.

In the 4-value 4-state Viterbi decoding process, if data is recorded after being coded using a coding process such as an RLL(1, 7) coding process with RLmin=2, and if PR($\alpha$, $\beta$, $\gamma$) is employed as the partial response characteristic in the reproducing process, there are 6 values and 4 states.

That is, the number of possible combinations of (b[j−1], b[j], b[j+1]) except for two states which are inhibited by the requirement of RLmin=2 is equal to $2^3-2=6$. The values of these six combinations at detection points, that is, the ideal reproduced signal values c[j+1] containing no noise and subjected to waveform equalization have different values.

(Ideally, four values are allowed. However, in practice, six values can occur because c011 and c110 are not identical to each other, and c100 and c001 are not identical to each other, as will be described below.)

Herein, these six values at detection points are denoted by cpqr, where p, q, r represent b[j−1], b[j], and b[j+1], respectively.

In FIG. 6, the values cpqr at detection points associated with the respective states S00, S01, S11, and S10 are shown. They are c000, c001, c011, c111, c110, and c100. c010 and c101 are inhibited because RLmin=2.

In the following discussion, it is assumed that there six values and four states according to the state transition diagram in FIG. 6.

The branch metric calculated for each of six state transitions shown in FIG. 6 is represented as follows.

First, a 2-bit state data value representing a before-transition state and a 2-bit state data value representing an after-transition state are put side by side into a series of four numerals. The two numerals at inner locations (that is, the second and third numerals) are collectively represented by one numeral. Thus, the result becomes a series of three numerals, which represents a branch metric which can occur during one reading clock cycle. For example, the branch metric corresponding to a state transition S11→S10 is represented by bm110. In this way, branch metrics corresponding to the six state transitions shown in FIG. 6 can be represented as shown in FIG. 7.

The values of branch metrics are defined as the Euclidean distances between the actual reproduced signal value z[k] sampled by the analog-to-digital converter 12 in response to the reading clock signal and the values at the respective detection points, as described below.

$$bm000=(z[k]-c000)^2 \tag{13}$$

$$bm001=(z[k]-c001)^2 \tag{14}$$

$$bm011=(z[k]-c011)^2 \tag{15}$$

$$bm111=(z[k]-c111)^2 \tag{16}$$

$$bm110=(z[k]-c110)^2 \tag{17}$$

$$bm100=(z[k]-c100)^2 \tag{18}$$

When the branch metric is calculated in the above-described manner, the values at the respective detection points are employed as the amplitude reference values. In the case where the path metric is normalized in order to avoid the calculation of squaring or for other purposes, the branch metric corresponding to the normalized path metric has different values from those calculated according to equations (13)–(18). In this case, the values at the detection points cannot be directly employed as the amplitude reference values, although the present invention may be applied.

Using the branch metric values obtained above, the path metric mij[k] associated with a state Sij at a point in time k is calculated as follows:

$$m10[k]=m11[k-1]+bm110 \tag{19}$$

$$m11[k]=\min(m11[k-1]+bm111, m01[k-1]+bm011) \tag{20}$$

$$m01[k]=m00[k-1]+bm001 \tag{21}$$

$$m00[k]=\min(m00[k-1]+bm000, m10[k-1]+bm1000) \tag{22}$$

As shown in FIG. 1, the output of the analog-to-digital converter 12 is supplied to the BMC 132 and the shift register 131 in the Viterbi decoder 13.

The Viterbi decoder 13 selects a most likely transition for the reproduced signal value z[k] supplied from the analog-to-digital converter 12 by operating the BMC 132, the AGS 133, and the SMU 134 and generates state data sm[k+n] representing the selected transition. Furthermore, the merge block 135 generates decoded data in accordance with the state data and supplies the resultant decoded data to the controller 2. The controller 2 performs a decoding process upon the supplied decoded data in a similar manner as described above with reference to the magneto-optical disk drive thereby reproducing user data and address data.

The state data output from the SMU 134 is also supplied to the adaptive amplitude reference value setting unit (RAA) 136.

On the other hand, after a predetermined time delay, the shift register 131 transfers the reproduced signal z[k] received from the analog-to-digital converter 12 to the RAA 136. The time delay is required to adjust the timing of the operation, because the state data generated by the Viterbi decoder 13 has a delay equal to n read clock pulses with respect to the reproduced signal z[k].

For the above reason, the state data generated by the SMU 134 of the Viterbi decoder 13 is represented as sm[k+n].

In accordance with the state data value sm[k+n] supplied at each point in time and also with the reproduced signal value z[k] supplied from the shift register 131 after being delayed by a period of time corresponding to n clock pulses, the RAA 136 updates the amplitude reference values each time a read clock pulse is input. The updated amplitude reference values are supplied to the BMC 132 in the Viterbi decoder 13.

The blocks of the Viterbi decoder 13 are described below.

The read clock signal DCK (hereinafter also referred simply as a clock) output from the PLL 14 is supplied to the respective blocks in the Viterbi decoder 13, that is, the BMC 132, the ACS 133, the SMU 134, and the merge block 135, so as to adjust the timing of operations of these blocks.

The BMC 132 calculates the branch metrics bm000–bm111 associated with the reproduced signal value z[k] according to equations (13)–(18) using the amplitude reference values supplied from the RAA 16. The calculated branch metrics are supplied to the ACS 133.

The ACS 133 calculates the path metrics according to equations (19)–(22) using the values of the supplied branch metrics and selects a most likely state transition by comparing the calculated values. The ACS 144 supplies select signals SEL00 and SEL11 to the SMU 135.

Figure 8:
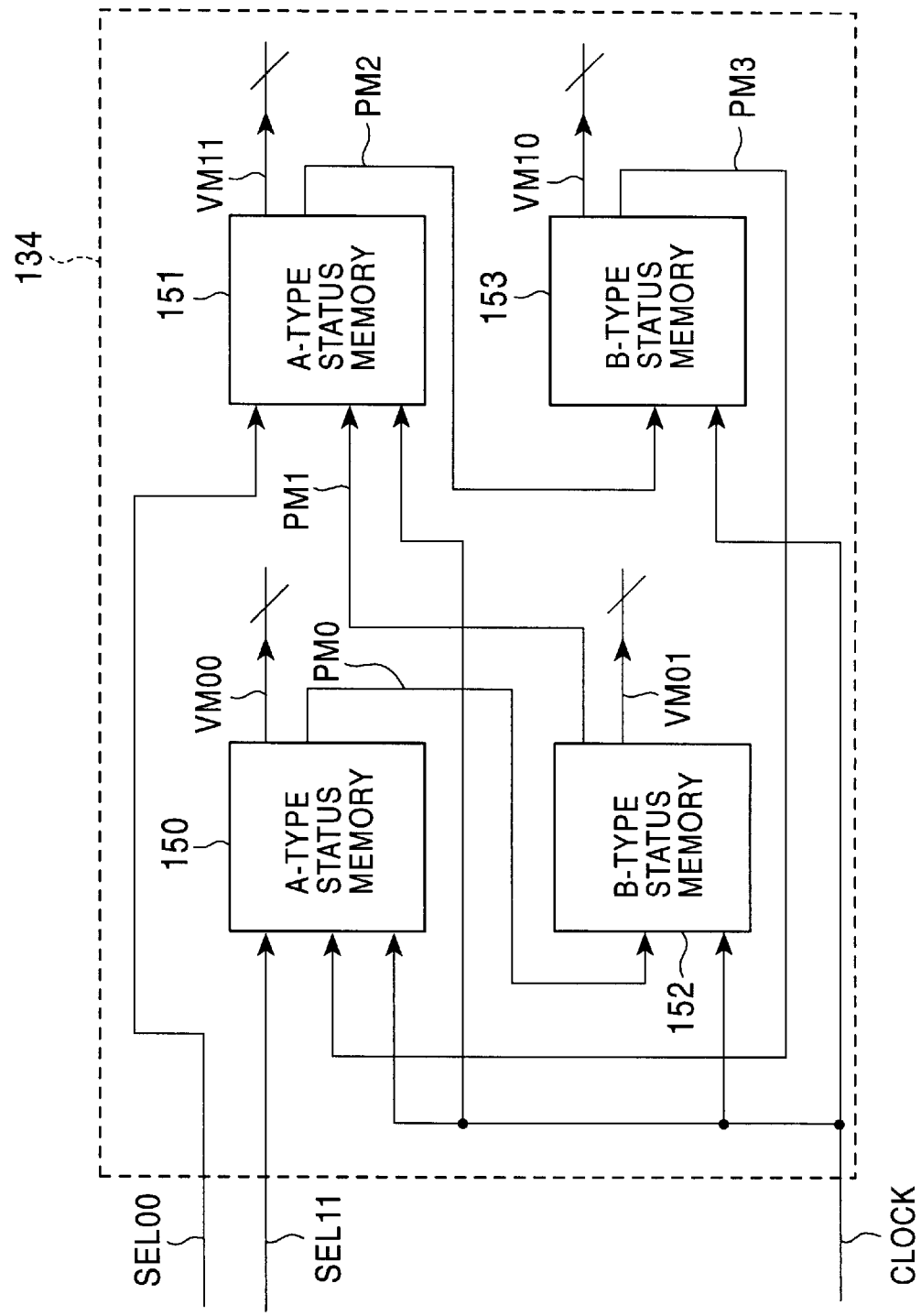
FIG. 8 is a block diagram illustrating an SMU in a Viterbi decoder.

Referring now to FIG. 8, the SMU 134 is described below. The SMU 134 generates state data in the form of a series of state data values sm[k+n] by means of processing in units of 2-bit state data values.

As shown in FIG. 8, the SMU 134 includes two A-type status memories 150 and 151 and two B-type status memories 152 and 153. Signal lines are connected to these status memories so that the select signals SEL00 and SEL11 and the clock signal are supplied to these status memories and so that state data is transferred among these status memories. The A-type status memories 150 and 151 correspond to states S00 and S11, respectively. On the other hand, the B-type status memories 152 and 153 correspond to states S01 and S10, respectively. The connections among these four status memories are made in accordance with the state transition diagram shown in FIG. 6.

Figure 9:
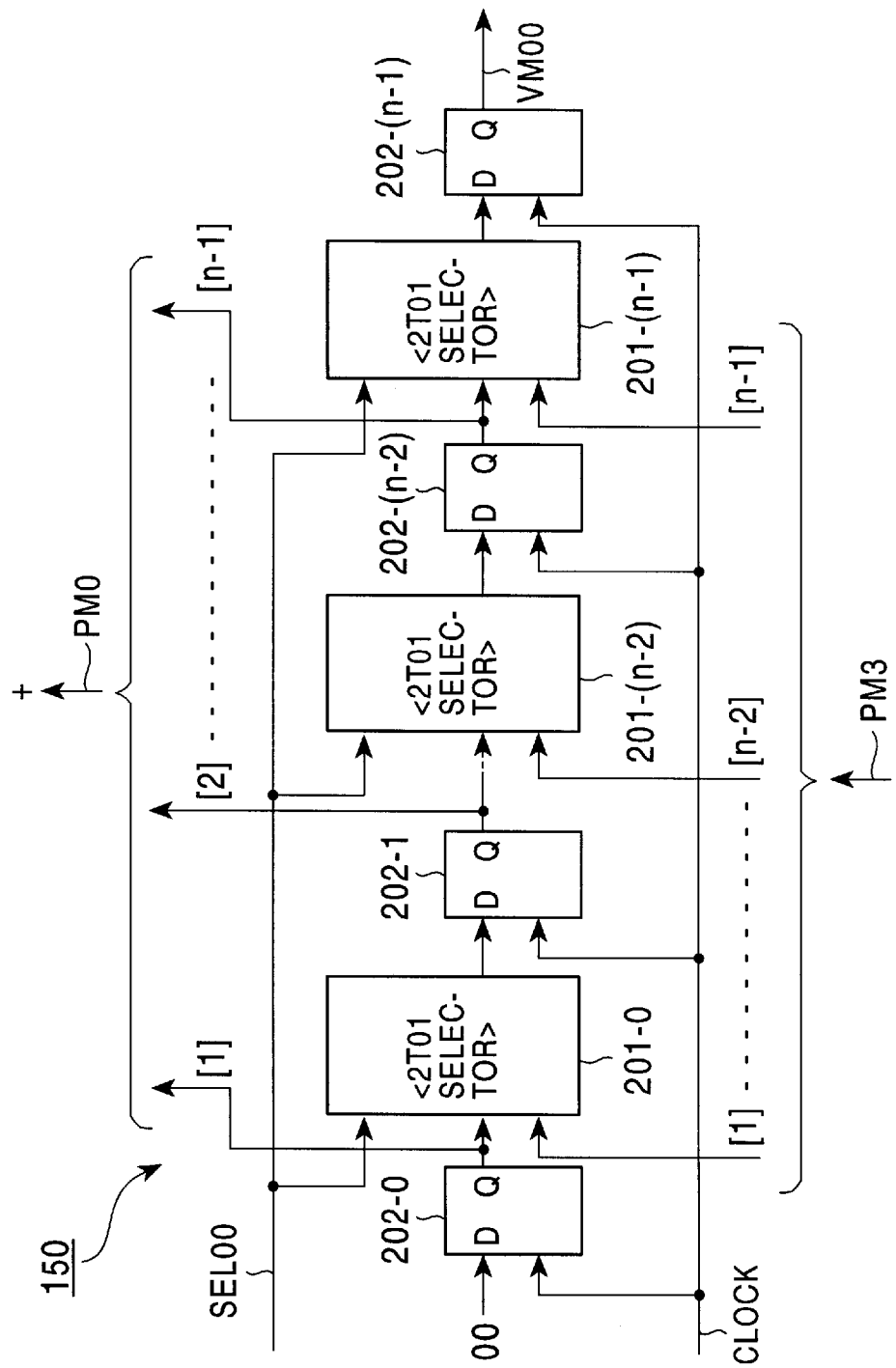
FIG. 9 is a block diagram illustrating an A-type status memory of the SMU in the Viterbi decoder.

The configuration of the A-type status memory 150 corresponding to state S00 is shown in FIG. 9.

The A-type status memory 150 includes n stages of processing units. More specifically, n selectors 201-0, . . . , 201-(n−1) and n registers 202-0, . . . , 202-(n−1) are alternately disposed and connected. The select signal SEL00 is supplied to each selector 201-0, . . . , 201-(n−1). Furthermore, n-bit state data is transferred as PM3 to each selector from the B-type status memory 153 corresponding to state S10. On the other hand, state data consisting of n−1 state data values is supplied as PM0 to the respective registers from the B-type status memory 152 corresponding to state S01. Furthermore, the clock signal is supplied to the respective registers 202-0, . . . , 202-(n−1).

The selectors operate as follows. As shown in FIG. 6, when the current state is S00, the previous state which could go to state S00 during one clock cycle was either S00 or S10. If the immediately previous state was S00, a transition to the same state occurred during one clock cycle. As a result, to the first-stage selector 201-0, "00" is input as the newest state data value of state data generated by means of serial shifting. The selector 201-0 also receives, as a parallel load, the newest state data PM3[1] of state data supplied from the B-type status memory 153. The selector 201-0 selects one of these two state data in accordance with the select signal SEL00 and supplies the selected state data to the register 202-0 at the following stage.

The selectors 201-1, . . . , 201-(n−1) at the second and following stages receives receive two data, that is, one state data value supplied as a parallel load from the B-type status memory 153 corresponding to S10 and one state data value which is serially shifted and output from the register at the previous stage. Each selector 201-1, . . . , 201-(n−1) selects a most likely one of the two state data in accordance with the select signal SEL00 and supplies the selected state data value to the following stage. Because all selectors 201-0, . . . , 201-(n−1) operate in accordance with the same select signal SEL00, state data in the form of a series of most likely data values selected by the ACS 133 is inherited.

Furthermore, when the respective registers 202-0, . . . , 202-(n−1) acquire state data values supplied in the above-described manner in accordance with the clock signal, the state data values stored therein are updated. The outputs of the respective registers are supplied to status memories corresponding to states a transition to which is allowed, as described above. Because a transition from state S00 to itself is allowed, a serially shifted data is supplied to a selector at the following stage. Furthermore, the output is supplied as a parallel load to the B-type status memory 152. The register 202-(n−1) at the final stage outputs a state data value VM00. When the state data value VM00 is output in accordance with the clock signal, the overall state data is generated.

The A-type status memory 151 corresponding to state S11 is configured in a similar manner to the A-type status memory 150. However, in the A-type status memory 151, state data PM1 is supplied as a parallel load corresponding to the state transition S01→S11 shown in FIG. 6 from the B-type status memory 152 corresponding to state S01. The A-type status memory 151 supplies state data PM2, as a parallel load corresponding to the transition S11→S10 shown in FIG. 6, to the B-type status memory 153 corresponding to state S10.

Figure 10:
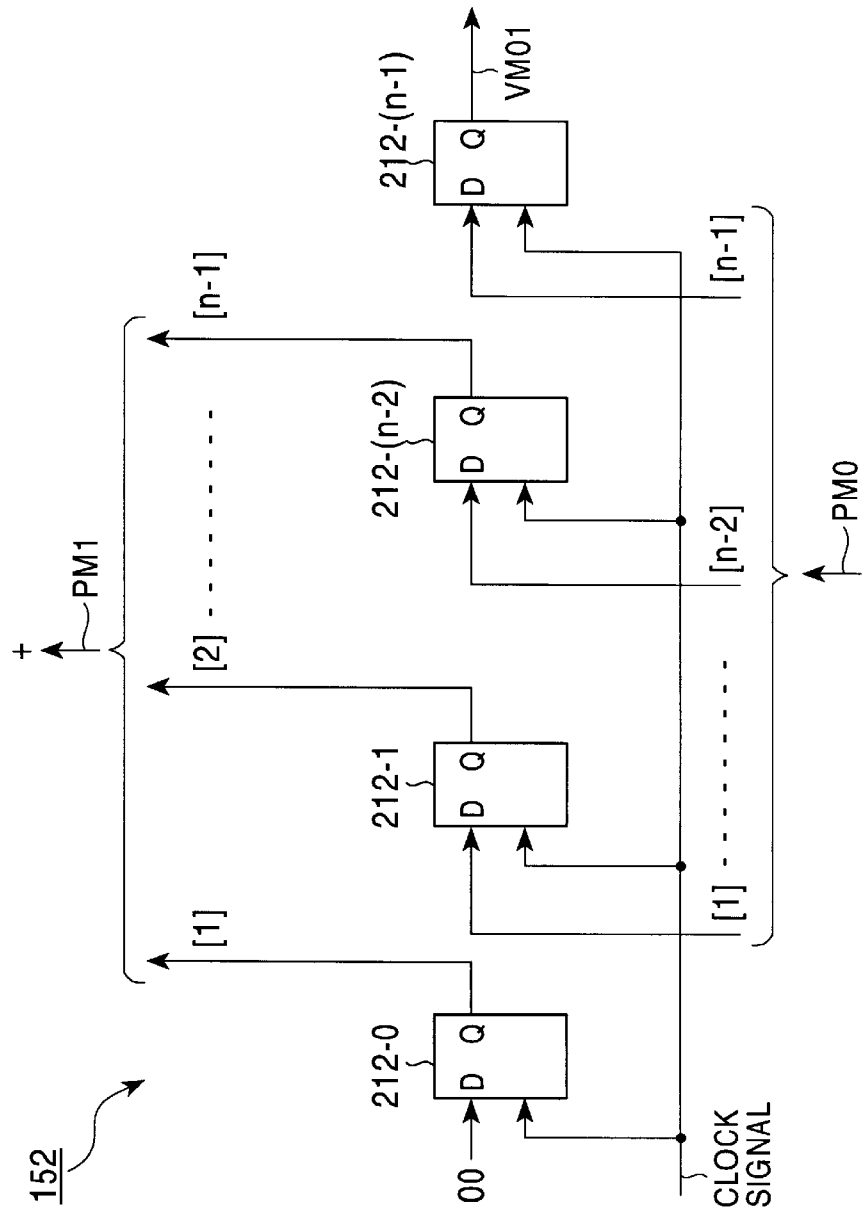
FIG. 10 is a block diagram illustrating a B-type status memory of the SMU in the Viterbi decoder.

Referring now to FIG. 10, the status memory 152 corresponding to state S01 is described below. As can be seen from FIG. 6, each B-type status memory does not inherit itself and has only one state a transition to which is allowed. Therefore, serial shifting is not performed, and there is no selector. That is, the status memory 152 consists of n registers 212-1, 212-1, . . . , 212-(n−1), and the clock signal is supplied to these registers so as to adjust the timing of their operation.

The state data consisting of n−1 state data values is supplied as PM0 from the A-type status memory 150 corresponding to state S00 to the respective registers 212-0, 212-1, . . . , 212-(n−1). However, to the register 212-0 at the first stage, "00", is always input in synchronization with the clock. This is required because only the state S00 is allowed to transit to state S01, as can be seen from FIG. 6. In synchronization with the clock, state data values are input to the respective registers 212-1, . . . , 212-(n−1) and thus the state data values stored therein are updated. The respective registers output state data PM1 consisting of n−1 state data values in synchronization with the clock. The output state data PM1 is supplied to the A-type status memory 151 corresponding to state s11 a transition to which is allowed. The register 212-(n−1) at the final stage outputs state data value VM01. When the state data value VM01 is output in accordance with the clock signal, the overall state data is generated.

The B-type status memory 153 corresponding to state S10 is configured in a similar manner to the B-type status memory 152. However, the B-type status memory 153 receives state data PM2 as a parallel load corresponding to the transition S11→S10 shown in FIG. 6 from the A-type status memory 151 corresponding to state S11, and the B-type status memory 153 outputs state data PM3 as a parallel load corresponding to the transition S10→S00 shown in FIG. 6 to the A-type status memory 150. In synchronization with the clock, "11" is always input to the register at the first stage. This is required because only the state S11 is allowed to transit to state S10, as can be seen from FIG. 6.

In the Viterbi decoding method, the state data values VM00, VM11, VM01, and VM10 generated by the respective status memories become identical to each other when the memory length n of each status memory is sufficiently large. In this case, the state data value output from any one of the four status memories may be supplied as sm[k+n] to the following stage. The memory length n is determined taking into account the C/N ratio and the frequency-characteristic of the reproduced signal.

The state data sm[k+n] output from the SMU 134 is supplied to the merge block 135.

The merge block 135 includes a decoding matrix table shown in FIG. 11, wherein the decoding matrix table is stored in a ROM in the merge block 135. The merge block 135 generates decoded data from the state data in accordance with the decoding matrix table. The resultant decoded data is supplied to the controller 2. As can be seen from the state transition diagram shown in FIG. 6, the decoded data value corresponds to two successive state data values. That is, the decoded data value at a point in time k+n can be determined from the state data value sm[k+n] generated in correspondence with the reproduced signal value z[k] and the state data value sm[k+n−1] generated in correspondence with the reproduced signal value z[k−1] at an immediately previous point in time.

For example, when sm[k+n]="01" and sm[k+n−1]="00", the decoded data value becomes "1" as can be seen from FIG. 6. Such a correspondence is represented in the decoding matrix table shown in FIG. 11.

Now, the operation performed by the RAA 136 to update the amplitude reference values is described.

As described earlier, the six amplitude reference values c000–c111 vary owing to various factors. The variations in the amplitude reference values are not systematic and thus cannot be predicted. In view of the above, the amplitude reference values are adaptively modified so that the amplitude reference values are varied depending on the distortion or variation in the RF signal and the phase error of the clock signal thereby improving the accuracy of the branch metric calculation.

Each time a clock pulse is input, the RAA 136 calculates the amplitude reference values in accordance with the state data generated by the SMU 134 in the above-described manner and the reproduced signal value z[k] delayed by the shift register. This calculation is performed as follows.

When a state data value sm[k+n] generated in correspondence with a reproduced signal value z[k] and a state data value sm[k+n−1] at the immediately previous point in time are given, it is possible to determine the state transition between these two state data values using the state transition diagram shown in FIG. 6 and thus it is possible to determine the amplitude reference values corresponding to that state transition. New amplitude reference values are calculated from the current values and the reproduced signal value z[k].

In the case where a disk medium the calculation of the amplitude reference values is performed separately for each type of area. Therefore, in this case, the amplitude reference values the number of which is equal to 6×2=12 are adapted in the 6-value 4-state Viterbi decoding process.

The calculation of the amplitude reference values is described in further detail below, by way of example, for the case where sm[k+n]="01" and sm[k+n−1].

This corresponds to the state transition S01→S11 shown in FIG. 6. It can be seen from FIG. 6 that the amplitude reference value corresponding to that state transition is c011. Thus, the RAA 136 calculates the amplitude reference value as follows.

$$c011(\text{new}) = \delta z[k] + (1-\delta) c011(\text{old}) \tag{23}$$

In general, when sm[k+n]=pq and sm[k+n−1]=qr, the new amplitude reference value is given by:

$$cpqr(\text{new}) = \delta z[k] + (1-\delta) cpqr(\text{old}) \tag{24}$$

In the above equations, $\delta$ is a correction factor. When the value of $\delta$ is determined, it is required to take into account the relatively long-term characteristics of the recording/reproducing system such as the amplitude of the reproduced signal and the variation thereof, distortion such as asymmetry, the operation error of the waveform equalizer, and also an irregular characteristic due to a defect or the like of the recording medium.

When $\delta$ is set to a large value, the variation in the amplitude of the reproduced signal, the asymmetry, and other errors such as a waveform equalizer error are greatly reflected in the amplitude reference values updated according to equation (23) or (24). However, a large value of $\delta$ also causes the updated amplitude reference values to be greatly affected by an irregular signal due to a defect or the like of the recording medium. It is possible to reduce the influence of the irregular signal due to the defect or the like upon the updated amplitude reference value by setting $\delta$ to a small value. However, in this case, the adaptation of the amplitude reference values is performed gradually in response to the reproduced signal, and the effects of the adaptation of the amplitude reference values become small.

The new amplitude reference value calculated by the RAA 16 according to equations (23 and (24) is supplied to the BMC 132.

As can be understood from the above discussion, in the case of the 6-value 4-state Viterbi decoding process, amplitude reference values c000, c001, c011, c100, c110, and c111 are adapted.

By adaptively changing the amplitude reference values depending on various factors such as recording conditions and the focus error as described above, it is possible to minimize the influences of various factors.

FIG. 12 represents which amplitude reference value is updated for given states sm[k+n−1] and sm[k+n].

For example, when sm[k+n−1]="00" and sm[k+n]="00", that is, when a transition from S00 to S00 occurs, updating is performed for the amplitude reference value c000.

On the other hand, in the case of a transition from S00 to S01, the amplitude reference value c001 is updated. For the other transitions, a particular amplitude reference value corresponding to the transition is updated.

2. Embodiment of Disk Drive 2.1 Configuration of the Disk Drive

An embodiment of a disk drive using the Viterbi decoding method according to the present invention is described below.

The disk drive of the present embodiment may be advantageously applied to a WORM disk of the ablative type, a phase transition WORM disk, a magneto-optical (MO) disk, a phase transition rewritable disk (such as a DVD-RAM and a DVD-RW). That is, the disk drive of the present embodiment is advantageous in particular when being applied to a disk having a correlation between the recording laser power and the asymmetry of the reproduced RF signal.

Herein, by way of example, the disk drive of the present embodiment is assumed to drive an MO disk. Disk drives for driving disks having no correlation between recording laser power and asymmetry, such as an alloy-type WORM disk, will be discussed later as a modified embodiment.

Figure 13:
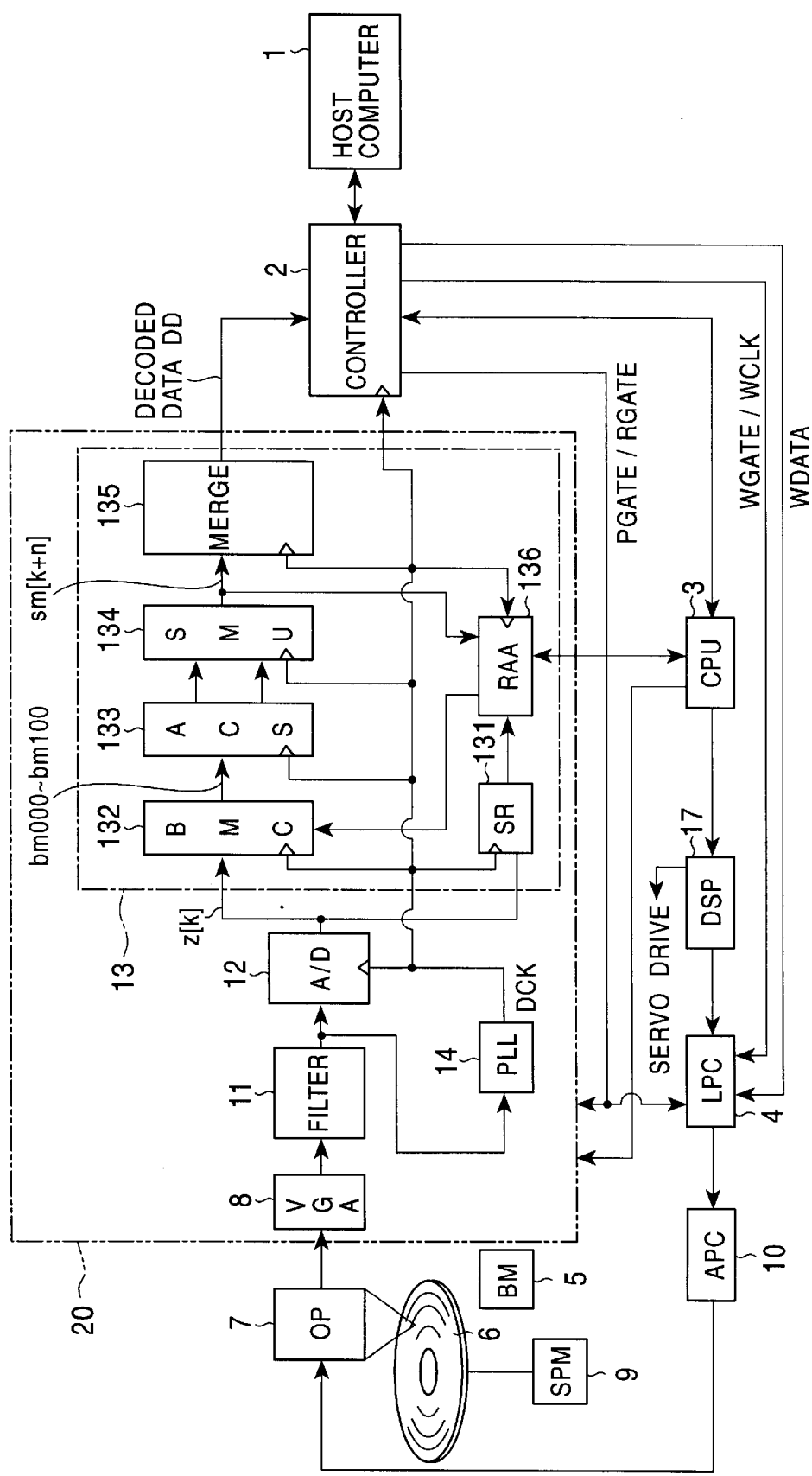
FIG. 13 is a block diagram illustrating an embodiment of a drive device.

FIG. 13 illustrates the configuration of the disk drive of the present embodiment. In FIG. 13, similar parts to those in FIG. 1 are denoted by similar reference numerals or symbols, and duplicated descriptions thereof are not given herein. Note that the purpose of the block diagram in FIG. 13 is to illustrate main parts of the system responsible for processing recording/reproducing signals and thus a servo system and other parts which are not essential to the present invention are not shown in the block diagram in FIG. 13.

A disk (MO disk) 6 serves as a recording medium and is rotated by a spindle motor 9 in the disk drive. Information is recorded/reproduced/erased onto/from the disk 6 by an optical pickup 7 and a magnetic head 5.

During the recording/reproducing/erasing operation, the control of the positions of the optical pickup 7 and the magnetic head 5 (seeking control, tracking servo control, sled servo control), the focus servo control for the laser beam output from the optical pickup 7, and the rotation servo control for the spindle motor 9 are performed by a servo system which is not shown in FIG. 13.

A drive controller (hereinafter referred to simply as a controller) 2 serves as a master controller of the disk drive and controls various operations thereof. The controller 2 is also responsible for communication with a host computer 1. More specifically, the controller 2 controls the operation of supplied data onto the disk 6 in response to a record command issued by the host computer 1. The controller 2 also controls the operation of reading requested data from the disk 6 in response to a command issued by the host computer 1 and transferring the data to the host computer 1. The controller 2 also has the capability of encoding and decoding data.

A CPU 3 serves to control the recording/reproducing operation under the control of the controller 2.

More specifically, the CPU 3 controls the various operations of the RF block 20 in the reproducing system. A DSP 17 serving as a servo processor is also controlled by the CPU 3.

In the recording operation, in accordance with a command issued by the host computer 1, the controller 2 receives user data to be recorded and encodes the user data represented in information words into data represented in codewords such as RLL(1, 7) codes. The resultant codewords are supplied as write data WDATA to an LPC 4.

The controller 2 also generates a WGATE signal thereby instructing the LPC 4 to output optical power at the specified timing in the recording mode. The controller 2 also generates a write clock signal WCLK to the LPC 4 so that the recording operation is performed in accordance with the write clock signal WCLK.

The LPC 4 and the APC 10 output a laser beam from the optical pickup 7 in accordance with the write data WDATA and the WGATE signal thereby recording the data onto the disk 6, in a similar manner as described earlier with reference to FIG. 1.

During the reproducing/recording operation, the output laser power level, that is, the magnitude of the laser drive pulse output from the LPC 4, is set to a proper value under the control of the DSP 17 (CPU 3). The controller 2 may change the laser power level during the recording/reproducing operation via the CPU 3.

In the reproducing operation (in the normal reproducing operation and the data reading operation for verification in the write and verify operation), the controller 2 and the CPU 3 control the operation as follows.

The controller 2 supplies a RGATE signal and a PGATE signal to the LPC 4 and the RF block 20 thereby controlling the reproducing operation.

More specifically, the controller 2 generates an RGATE signal to instruct the LPC 4 to continuously output laser power at a specified level to be used in the reproducing operation. The controller 2 also instructs the RF block 20 to perform a reproducing process. Furthermore, the controller 2 generates a PGATE signal thereby switching the processing mode depending on the area (embossed area or magneto-optical area) on the disk 6.

In the reproducing operation, the LPC 4 generates a laser drive pulse in accordance with the RGATE signal and outputs a laser beam from the optical pickup 7 thereby reproducing data.

The laser beam output from the optical pickup 7 falls on the magneto-optical disk 6. The optical pickup 7 detects light reflected from the magneto-optical disk 6 and generates various signals such as an RF signal, a focus error signal (not shown) and a tracking error signal (not shown) by processing a signal corresponding to the intensity of the reflected light.

The gain of the reproduced RF signal is adjusted by a variable gain amplifier 8 in the RF block 20, and the resultant RF signal is supplied to a filter 11.

The setting of the gain of the variable gain amplifier 8 is performed in accordance with a control signal GS1 output from the CPU 3. More specifically, the gain of the variable gain amplifier 8 is modified depending on the RF signal level, which varies depending on the type and characteristics of the disk, thereby adjusting the output RF signal level to a value optimum for the reproducing operation.

The reproduced RF signal supplied from the optical pickup 7 to the variable gain amplifier 8 includes two types of signals, that is, a sum signal and a difference signal, and the processing mode is switched, depending on the area of a sector, in response to the PGATE signal. More specifically, data reproduced from an area where embossed pits are formed is processed as a sum signal, and data reproduced from an area where a series of pits is formed magneto-optically is processed as a difference signal.

The reflected light information includes not only the reproduced RF signal corresponding reproduced data but also other signals such as a focus error signal and a tracking error signal. Although the focus error signal and the tracking error signal are not shown in the figure, they are supplied to the DSP 17, and the DSP 17 controls the servo system in accordance with the supplied focus error signal and tracking error signal.

A filter 11 includes an RF effective band boost circuit, a lowpass filter for removing noise, and a waveform equalizer for waveform equalization. The waveform equalizer equalizes the input signal so as to obtain a partial response characteristic which meets the requirements of the Viterbi decoding process performed by the Viterbi decoder 13.

An analog-to-digital converter 12 performs an analog-to-digital conversion in synchronization with the reproducing clock signal DCK supplied from a PLL 14 and outputs a reproduced signal value $z[k]$.

The Viterbi decoder 13 generates decoded data DD by performing a Viterbi decoding process upon the reproduced signal value $z[k]$ in synchronization with the reproducing clock signal DCK.

The configuration of the RF block 20 and the operation thereof and the configurations of blocks such as a BMC 132 in the Viterbi decoder 13 and the operations thereof are similar to those described earlier with reference to FIG. 1.

However, in the present embodiment, an RAA 136 is configured such that amplitude reference values c000–c111 calculated for the purpose of updating can be used by the CPU 3 to calculate the degree of asymmetry.

The decoded data DD output from the Viterbi decoder 13 is supplied to the controller 2. The controller 2 performs a decoding process corresponding to a channel coding process or the like upon the decoded data DD thereby reproducing user data. For example, a (1–7)RLL decoding process and an ECC (error correction code) process are performed.

In the reproducing operation, if reproduced data is not obtained from a certain sector owing to a decoding error, the controller 2 controls the operation so as to retry reproducing that sector.

2.2 Correlation between the Recording Laser Power and the Degree of Asymmetry

When data is recorded on a disk 6 such as a magneto-optical disk or a WORM disk by means of an optical modulation method, the sizes of marks (pits) recorded on the disk vary greatly depending on the recording laser power, and the variation in the size of the marks greatly affects the waveform of the reproduced RF signal.

The influences of the recording laser power upon the reproduced RF signal are described below. In the following description, by way of example, influences upon an impulse response of the RF signal are discussed.

Figure 14:
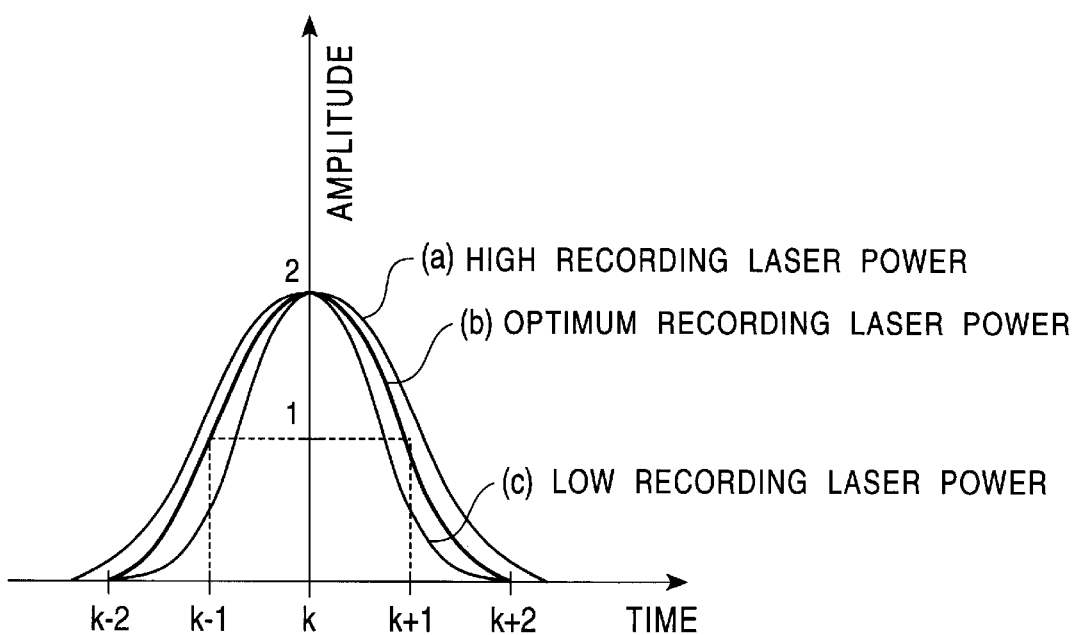
FIG. 14 illustrates the relationship between recorded laser power and impulse response.

FIG. 14 illustrates the relationship between the recording laser power and the impulse response of the reproduced RF signal. Herein, the PR(1, 2, 1) partial response of the reproduced RF signal is shown as an example.

When the recording laser power is optimum, the impulse response becomes as represented by curve (b) in FIG. 6.

In this case, the relative amplitudes sampled by the analog-to-digital converter at three sampling points in time k−1, k, k+1 become 1:2:1.

If the recording laser power increases, the size of marks recorded on the disk increases, and thus the impulse response becomes as represented by curve (a) with a large pulse width. As a result, the amplitudes at sampling points k−1 and k+1 become greater than half the peak value.

Conversely, if the recording laser power decreases, the size of marks recorded on the disk becomes small, and thus the impulse response becomes as represented by curve (c) with a small pulse width. As a result, the amplitudes at sampling points k−1 and k+1 become smaller than half the peak value.

The eye pattern of an actual reproduced RF signal can be represented by superimposing impulse responses at an arbitrary point in time k. FIG. 15 illustrates the dependence of the recording laser power upon the size of an open area of the eye pattern.

Figure 15A:
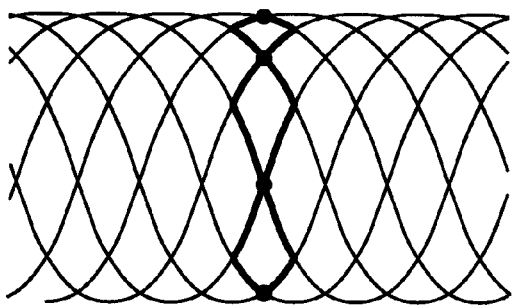
FIG. 15 illustrates the relationship between recorded laser power and eye pattern.
Figure 15B:
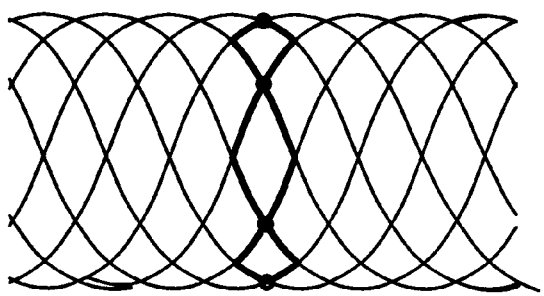

FIG. 15B illustrates an eye pattern obtained when the recording laser power is optimum. In this case, the eye pattern is symmetric in a vertical direction.

Figure 15C:
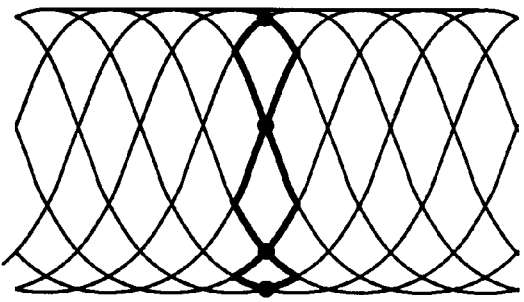

If the recording laser power is higher or lower than the optimum value, the eye pattern shifts upward or downward as shown in FIGS. 15A and 15C, respectively. That is, if the recording laser poser deviates from the optimum value, the eye pattern becomes asymmetric as shown in FIGS. 15A and 15B. In other words, the asymmetry is distortion in the reproduced RF signal waveform due to a deviation of the recording laser power from the optimum value.

In order to quantitatively represent the degree of asymmetry, the degree of asymmetry $\gamma asy$ is introduced herein as follows:

$\gamma asy$=(center voltage of 2T envelope−center voltage of 8T envelope)/(peak-to-peak voltage of 8T envelope)  (25)

Figure 16A:
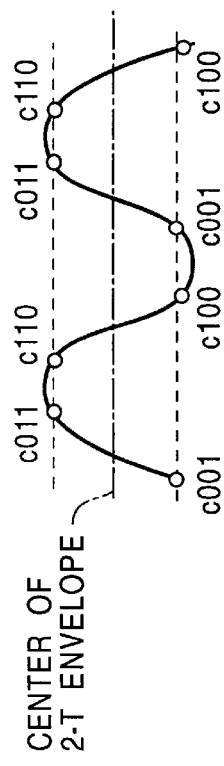
FIG. 16 illustrates envelopes of 2T and 8T patterns.
Figure 16B:
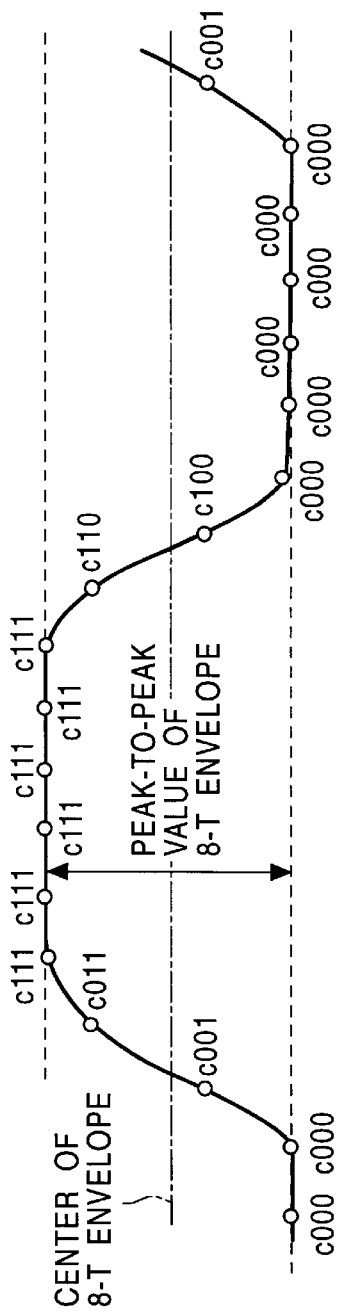

FIGS. 16A and 16B illustrate a 2T signal waveform and an 8T signal waveform, respectively.

If a reproduced RF signal having a 2T pattern is waveform-equalized, the resultant signal has a waveform in which the amplitude reference values c001, c011, c110, and c100 appear periodically as shown in FIG. 16A.

On the other hand, if a reproduced RF signal having an 8T pattern is waveform-equalized, the resultant signal has a waveform in which the amplitude reference values c000, c000, c000, c000, c000, c000, c001 c011, c111, c111, c111, c111, c111, c111, c110, c100, and c001 appear periodically as shown in FIG. 16B.

Figure 17:
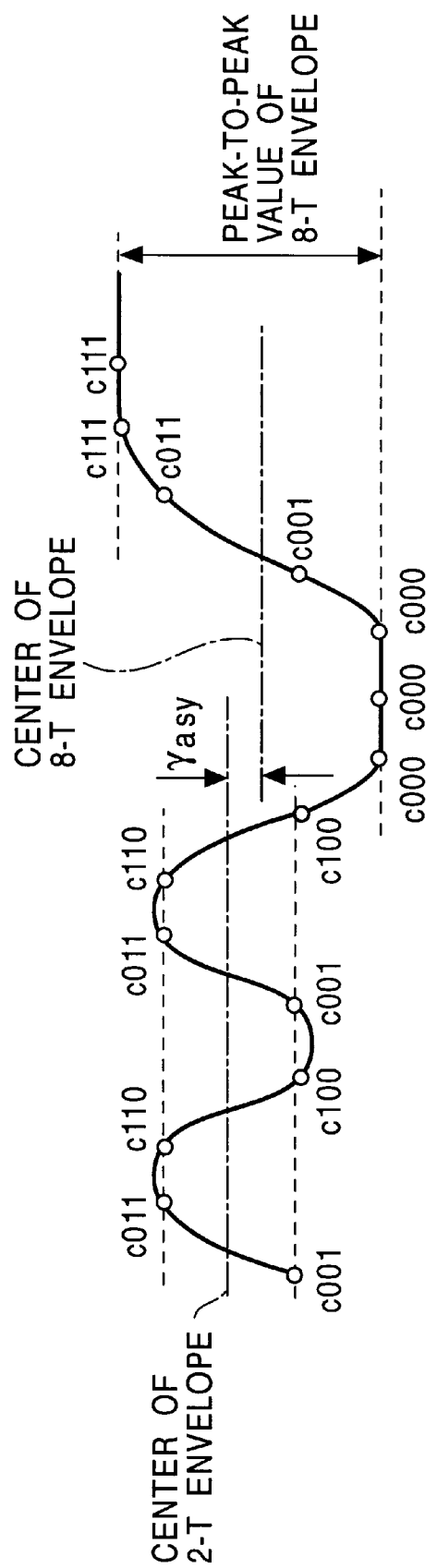
FIG. 17 illustrates asymmetry observed in the envelopes of 2T and 8T patterns.

In FIG. 17, a 2T pattern is shown together with an 8T pattern, in which the degree of asymmetry $\gamma asy$ is shown such that it can be seen visually.

It can be seen from FIG. 17 and equation (25) that the degree of asymmetry $\gamma asy$ for each eye pattern shown in FIG. 15 becomes as follows:

$\gamma asy > 0$ for recording laser power greater than the optimum value $\gamma asy = 0$ for optimum recording laser power $\gamma asy < 0$ for recording laser power smaller than the optimum value Thus, the recording laser power can be estimated from the degree of asymmetry $\gamma asy$. Therefore, if the recording laser power is controlled such that the degree of asymmetry $\gamma asy$ falls within a proper range, the recording laser power is maintained within a desirable range.

In order to calculate the degree of asymmetry $\gamma asy$ of the reproduced RF signal according to equation (25), it is required to detect the 2T envelope center voltage, the 8T envelope center voltage, and the 8T envelope peak-to-peak voltage.

As can be seen from FIGS. 16 and 17, these values can be calculated using the amplitude reference values employed in the Viterbi decoder 13.

More specifically, the 2T envelope center voltage can be determined as the mean value of the amplitude reference values c001, c011, c110, and c100.

On the other hand, the 8T envelope center voltage can be determined as the mean value of the amplitude reference values c000 and c111.

Furthermore, the 8T envelope peak-to-peak voltage can be determined as the difference between the amplitude reference values c000 and c111.

If these values are substituted into equation (25), then $\gamma asy = ((c001+c011+c110+c100)/4-(c000+c111)/2)/(c111-c000)$ (26)

As described earlier, the amplitude reference values c000–c111 are adaptively changed by the RAA 136 in the Viterbi decoder 13 and the updated amplitude reference values are supplied to the BMC 132.

When the amplitude reference values are adaptively changed in the above-described manner, if the reproduced RF signal is asymmetric, the respective amplitude reference values vary depending on the asymmetry.

Therefore, the CPU 3 (or the controller 2) shown in FIG. 13 can estimate the value of the recording laser power associated with the reproduced RF signal by performing the calculation according to equation (26) using the amplitude reference values calculated by the RAA 136.

Now, the allowable range of the degree of asymmetry $\gamma asy$ corresponding to the allowable range of the recording laser power is discussed below.

FIG. 18A shows the byte error rate (BER) as a function of the recording laser power (write power). In FIG. 18A, line (i) represents the characteristic obtained when the Viterbi decoding method is used, and line (ii) represents the characteristic obtained when the bit-by-bit decoding method is used.

As can be seen from FIG. 18A, both the Viterbi decoding method and the bit-by-bit decoding method have high error rates in region A where the recording laser power is low (lower than P1). This means that recording laser power lower than P1 is too low. Also in region D where the recording laser power is high (higher than P3), both the Viterbi decoding method and the bit-by-bit decoding method have high error rates. Thus, recording laser power higher than P3 is too high.

On the other hand, in region C where the recording laser power is within the range from P2 to P3, the error rate is low enough in either decoding method. That is, recording laser power within the range from P2 to P3 can be regarded as adequate.

In region B where the recording laser power is within the range from P1 to P2, a low enough error rate can be obtained if the Viterbi decoding method is employed. Therefore, disk drives using the Viterbi decoding method have the capability of correctly handling data recorded with recording laser power within the range from P1 to P3. However, the bit-by-bit decoding method has high error rates in region B, and thus disk drives using the bit-by-bit decoding method cannot correctly handle data recorded with recording laser power within the range from P1 to P2.

From the above discussion, it can be concluded that if the recording laser power is within the range from P2 and P3, no problem occurs regardless of whether the Viterbi decoding method or the bit-by-bit decoding method is employed.

FIG. 18B shows the degree of asymmetry of the reproduced RF signal, corresponding to FIG. 18A. As shown in FIG. 18B, the degree of asymmetry is proportional to the recording laser power.

When the desirable range of the recording laser power is from P2 to P3, the corresponding range of the degree of asymmetry $\gamma asy$ becomes as follows:

$$\gamma asy2 < \gamma asy < \gamma asy3 \tag{27}$$

In the reproducing operation, if the degree of asymmetry $\gamma asy$ calculated according to equation (26) falls within the range represented in (27), it can be concluded that the data being reproduced has been recorded with recording laser power within the desirable range.

In the case of the disk drive according to the present embodiment shown in FIG. 13, the Viterbi decoding method is employed, and besides, the amplitude reference values are adaptively varied, and thus the disk drive has an extremely high reproducing ability.

Therefore, in most cases in which the degree of asymmetry $\gamma asy$ is not even within the range $\gamma asy2 < \gamma asy < \gamma asy3$, data can be correctly read. However, if the recording laser power deviates greatly from the desirable range, there is a possibility that even the disk drive of the present embodiment cannot correctly read data.

If a reading error occurs for a certain sector in the reproducing operation, the reading of that sector is retried. When the reading is retried, the amplitude reference values are adaptively changed depending on the recording laser power (that is, depending on the RF signal associated with the data of that sector) estimated from the degree of asymmetry so that the data can be correctly read.

2.3 Example of Reproducing Process (I)

As described above, it is possible to determine, from the degree of asymmetry $\gamma asy$ of the reproduced RF signal, whether the recording laser poser is within the desirable range. In the present embodiment, if a decoding error occurs when data is reproduced from the disk 6, the reading operation is retried after adaptively changing the amplitude reference values depending on the recording laser power with which the data has been recorded.

Figure 19:
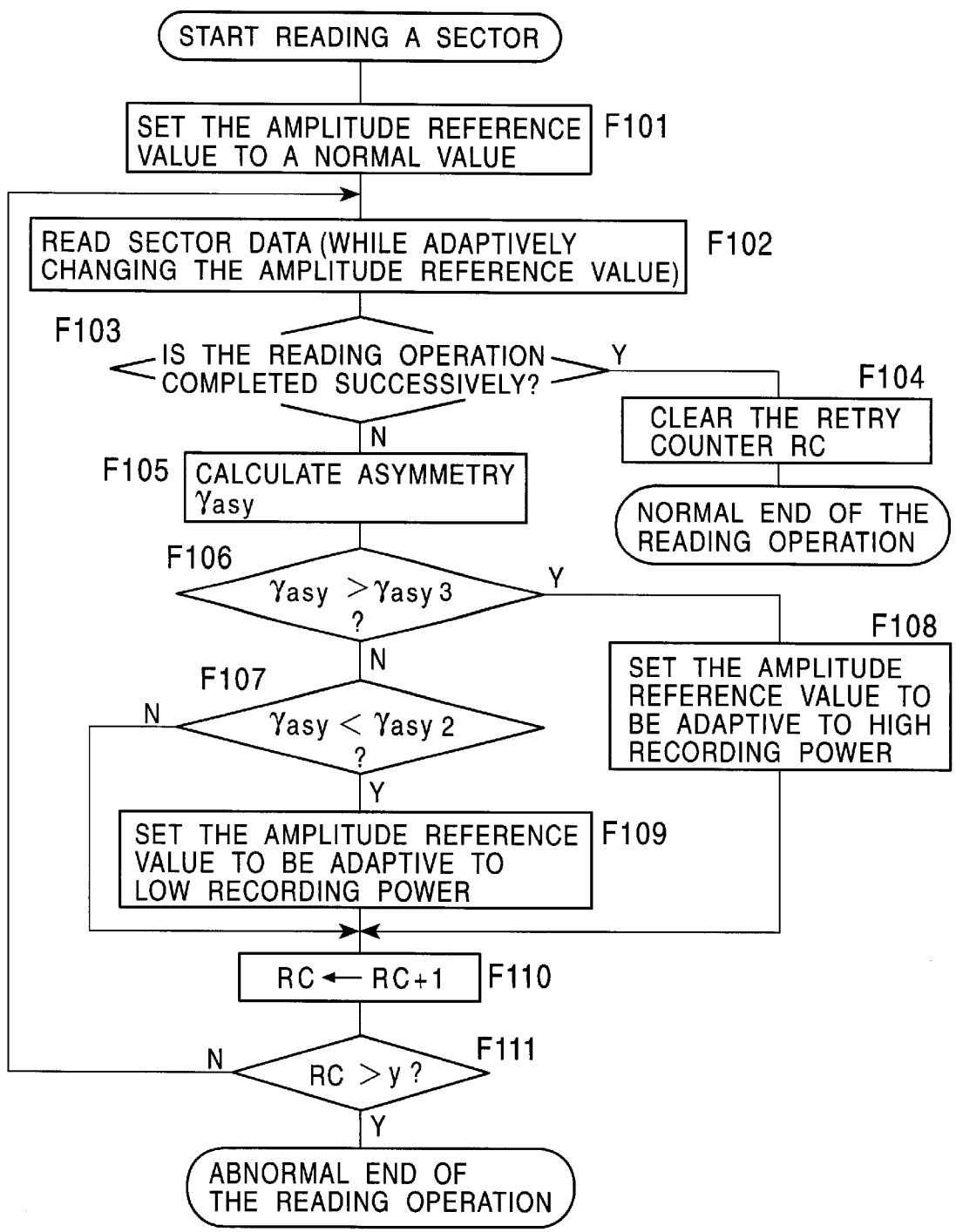
FIG. 19 is a flow chart illustrating a reproducing process according to an embodiment of the invention.

Referring to FIG. 19, the reproducing process including such as a retrying operation is described below.

In response to a data reproduction command issued by the host computer 1, the controller 2 starts to control the operation of reproducing data from a specified sector of the disk 6. More specifically, as described earlier, the controller 2 generates an RGATE signal and a PGATE signal thereby instructing the DSP 17 and the RF block 20 to perform the servo control process, the emission of a laser beam, and the reproducing process. The controller 2 also decodes the Viterbi-decoded data supplied from the Viterbi decoder 13 and transfers the resultant data to the host computer 1.

Although the process shown in FIG. 19 is only for one sector, reproduction in the actual operation is performed sector by sector.

In a first step F101 in the process of reproducing data from one sector, the controller 2 sets the amplitude reference values (c000–c111), used by the BMC 132 of the Viterbi decoder 13, to normal (initial) values. More specifically, these values are set in the BMC 132 via the CPU 3 and the RAA 136.

Then in step F102, the controller 2 controls various parts to operate in the above-described manner thereby reproducing data from a sector of the disk 6 and performing a decoding process (1–7 decoding and error correction process) upon the Viterbi-decoded data DD supplied.

In the above reproducing process, the RAA 136 adaptively changes the amplitude reference values.

In step F103, it is determined whether or not data has been read successfully, that is, whether or not decoding has been correctly performed without encountering an error in the synchronization and the ECC process.

If it is determined that data has been successfully reproduced from that sector, then the process goes from step S103 to F104, and the retry counter RC indicating the number of retrying operations is cleared. Thus, the reproducing process for that sector is completed. If there is another sector to be reproduced, the process starts to reproduce data from that sector.

However, if it is determined in step F103 that a decoding error occurs, the process goes to step F105 to retry the reproducing operation.

In step F105, the CPU 3 calculates the degree of asymmetry $\gamma asy$. Then in steps F106 and F107, the calculated degree of asymmetry $\gamma asy$ is compared with reference values $\gamma asy2$ and $\gamma asy3$ indicating the lower and upper allowable limits described earlier with reference to FIG. 18, thereby determining whether the recording laser power is within the allowable range.

If the calculated degree of asymmetry $\gamma asy$ is within the range $\gamma asy2 < \gamma asy < \gamma asy3$, that is, if the recording laser power is within the allowable range, then the process goes to step F106→F107→F110. After incrementing the retry counter RC in step F110, the value of the retry counter RC is checked in step F111. The process then returns to step S102 to retry reproducing the data from the current sector. That is, in this case, the amplitude reference values which have been adapted by the RAA 136 and used in the previous reproducing operation are maintained unchanged.

Alternatively, when it is determined that the recording laser power is within the allowable range, the process may return to step F101 and the retrying operation may be performed after resetting the amplitude reference values to normal (initial) values.

On the other hand, in the case where it is determined in step F106 that the degree of asymmetry $\gamma asy$ calculated in step F105 is greater than γasy3, the data of that sector can be regarded as having been recorded with too large laser power. That is, it can be concluded that the error in the present reproducing operation is due to the great deviation of the recording laser power beyond the upper allowable limit.

Therefore, in step F108, the amplitude reference values are changed to be suitable for the high recording laser power. Then in step F110, the retry counter RC is incremented. Thereafter in step F111 the value of the retry counter RC is checked. The process then returns to step F102 to retry the operation of reproducing the current sector.

Now, the amplitude reference values match the large recording laser power from the beginning of the retrying operation for that sector. Thus, the retrying of the reproducing operation results in an extremely great increase in the probability that the sector, which could not be correctly reproduced in the previous operation due to the inadequate recording laser power, can be successfully reproduced.

If the data has been reproduced successfully in the retrying operation, then the process goes to step F 104, and the reproduction of the sector is successfully completed.

When the retrying operation is performed after a decoding error occurs, if it is determined in step F107 that the degree of asymmetry γasy calculated in step F105 is smaller than γasy2, then the data of the sector can be regarded as having been recorded with too small laser power. That is, it can be concluded that the error in the reproducing operation is due to the great deviation of the recording laser power beyond the lower allowable limit.

Therefore, in step F109, the amplitude reference values are changed to be suitable for the low recording laser power. Then in step F110, the retry counter RC is incremented. Thereafter in step F111 the value of the retry counter RC is checked. The process then returns to step F102 to retry the operation of reproducing the current sector.

Now, the amplitude reference values match the low recording laser power from the beginning of the retrying operation for that sector. Thus, the retrying of the reproducing operation results in an extremely great increase in the probability that the sector, which could not be correctly reproduced in the previous operation due to the inadequate recording laser power, can be successfully reproduced. If the data has been reproduced successfully in the retrying operation, then the process goes to step F 104, and the reproduction of the sector is successfully completed.

If a decoding error due to inadequate recording laser power occurs in a retrying operation (performed one or more times) after changing the amplitude reference values, the amplitude reference values are further changed so that the data can be correctly reproduced. Thus, the reproducing ability of the disk drive is extremely enhanced.

The retrying operation is performed repeatedly as long as a decoding error occurs. However, it the number of retrying operations reaches the maximum limit y, the operation is terminated. That is, the number of retrying operations is checked in step F111, and if the number of retrying operations becomes y, a further retrying operation is not performed (if RC>y in step F111). In this case, the process is terminated abnormally without obtaining successfully decoded data.

The controller 2 informs the host computer 1 that the operation of reproducing the sector has been terminated abnormally.

The main purpose of the present embodiment is to make it possible to reproduce even data which has been recorded with inadequate laser power, and thus the process for adaptation of other parameters is not shown in FIG. 19. However, if a decoding error occurs owing to a cause other than the inadequate recording laser power (that is, if a decoding error occurs when the degree of asymmetry γasy is within the allowable range), then another parameter which can affect the reproducing ability may be changed. For example, parameters such as the gain of the variable gain amplifier, the characteristic of the filter 11, and/or the reproducing laser power level are adjusted so as to increase the probability that data is decoded successfully.

In the process shown in FIG. 19, the recording laser power is simply evaluated as to whether it is too large, optimum, or too low, and the amplitude reference values are changed when the recording laser power is regarded as being too high or too low. Alternatively, the evaluation of the recording laser power and the adaptation of the amplitude reference values may be performed with respect to a greater number of levels.

Because the degree of asymmetry is proportional to the recording laser power as described earlier, the degree of deviation of the recording laser power from the optimum value can be precisely determined from the degree of asymmetry. For example, when γasy>γasy3, that is, when the recording laser power is too large, the amplitude reference values may be set depending on the degree of deviation of the recording laser power (that is, depending on the value of γasy−γasy3). That is, in this case, a large number of amplitude reference levels are used for adaptation to high recording laser power. Similarly, a large number of amplitude reference levels may be used for adaptation to low recording laser power.

In the case where the Viterbi decoding method is employed as is the case in the present embodiment, the degree of asymmetry may be calculated using the amplitude reference values as described above. Alternatively, the degree of asymmetry may also be calculated by sampling the envelope of the RF signal and using the sampled values.

That is, if the values required for the calculation according to equation (25) is acquired as sampled values, the degree of asymmetry γasy can be calculated.

The operation of the present embodiment described above may be applied to a wide variety of drive devices in which the degree of asymmetry depends on the recording laser power.

2.4 Example of Reproducing Process (II)

Another example of a reproducing process applicable to the drive device of the present embodiment is described below with reference to FIG. 20.

In the reproducing process and the retrying process, most steps are similar to those described above with reference to FIG. 19, and those steps (F101–F111) are denoted by similar step numbers and they are not described in further detail hereon.

The present example of the reproducing process includes an additional step F100 for determining whether or not the current sector is the first sector of one or more sectors to be reproduced successively.

If the current sector is the first sector to be reproduced, then the process goes from step F100 to F101 to perform a similar process to that shown in FIG. 19. However, if the current sector is the second or the following sector, the process goes from step F100 to F102. That is, in this case, step F101 for setting the amplitude reference values to initial values is skipped.

In general, a plurality of sectors which have been recorded successively in one recording operation are reproduced in one reproducing operation.

A plurality of sectors recorded in one recording operation are very likely to have been recorded with the same level of recording laser power.

This means that if the recording laser power associated with the first sector is adequate, the recording laser power associated with the following sectors is very likely to be adequate. Conversely, if the recording laser power associated with the first sector is inadequate, the recording laser power associated with the following sectors is very likely to be inadequate.

In view of the above, in the present example of the reproducing process, when reproduction of a certain sector is started, the amplitude reference values employed for the immediately previous sector are used without changing them. That is, step F101 for resetting the amplitude reference values to initial values is skipped.

Herein, the sectors which are successively reproduced in one operation are not limited to those which are at physically successive locations. When data is recorded on a disk medium, one piece of continuous data may be recorded in a plurality of sectors which are physically apart from one another. More specifically, there is a possibility that the first sector and the following second sector are physically apart from each other. Therefore, in step F100, the "previous sector" refers to a sector which has been reproduced immediately before the current sector.

Thus, in the present example of the reproducing process, reproduction of a sector is performed differently depending on the immediately previous sector, as described below.

In the case where the immediately previous sector has been reproduced successfully without performing a retrying operation, the amplitude reference values can be regarded as having been adaptively changed from the initial values to optimum values. In this case, the recording laser power can be regarded as being adequate (or within the range allowable for the drive device of the present embodiment even if it is not adequate), and thus the amplitude reference values (adaptively modified to optimum values during the reproducing operation) employed at the end of the previous sector are also adequate for the current sector.

Therefore, it is possible to maximize the probability of successfully reproducing the current sector, by employing the amplitude reference values used at the end of the previous sector. If, unfortunately, the amplitude reference values are inadequate, they are adapted during the reproducing process for the current sector. If a decoding error occurs, the amplitude reference values may be reset to new values as required.

In the case where a decoding error due to inadequate laser power occurs in the operation of reproducing the immediately previous sector and thus the reproducing operation is retried after resetting the amplitude reference values in step F108 or F109, the current amplitude reference values which have been reset in step F108 or F109 (and further adapted in a retrying operation) are very likely to be optimum for the current sector. Therefore, also in this case, it is possible to maximize the probability of successfully reproducing the current sector, by employing the amplitude reference values used at the end of the previous sector.

As described above, the probability of successfully decoding data can be increased by starting the operation of reproducing a sector using the amplitude reference values finally used for the previous sector. This results in an increase in efficiency of the reproducing operation and an improvement in the reliability of the reproducing operation.

2.5 Modified Embodiments

The technique described above is applicable to disk drives which use a disk having a correlation between the recording laser power and the degree of asymmetry. However, some types of WORK disks, such as an alloy-type disk, do not have a correlation between the recording laser power and the degree of asymmetry.

In the alloy-type WORM disks, a film, which has a multi-layer form before being recorded, is melted by heat imposed by recording laser power and thus the multi-layer structure is converted into a mixed form. When the film is cooled, the melted parts of the film become alloyed parts having an increased reflectance. As a result, marks with different reflectance are formed.

In the alloy-type disks, the degree of asymmetry is not substantially affected by the recording laser power. Therefore, it is impossible to estimate the recording laser power on the basis of the degree of asymmetry.

On the other hand, in the alloy-type WORM disks, the RF amplitude of the reproduced RF signal increases with increasing recording laser power. This is because the thermal diffusion in the recording operation varies depending on the recording laser power.

In view of the above, the embodiment of the disk drive according to the present invention may be modified such that the amplitude of the reproduced RF signal is detected instead of the degree of asymmetry, and the recording laser power is estimated on the basis of the amplitude of the reproduced RF signal. Also in this modified embodiment, the amplitude reference values may be changed as required, when a retrying operation is performed.

Figure 20:
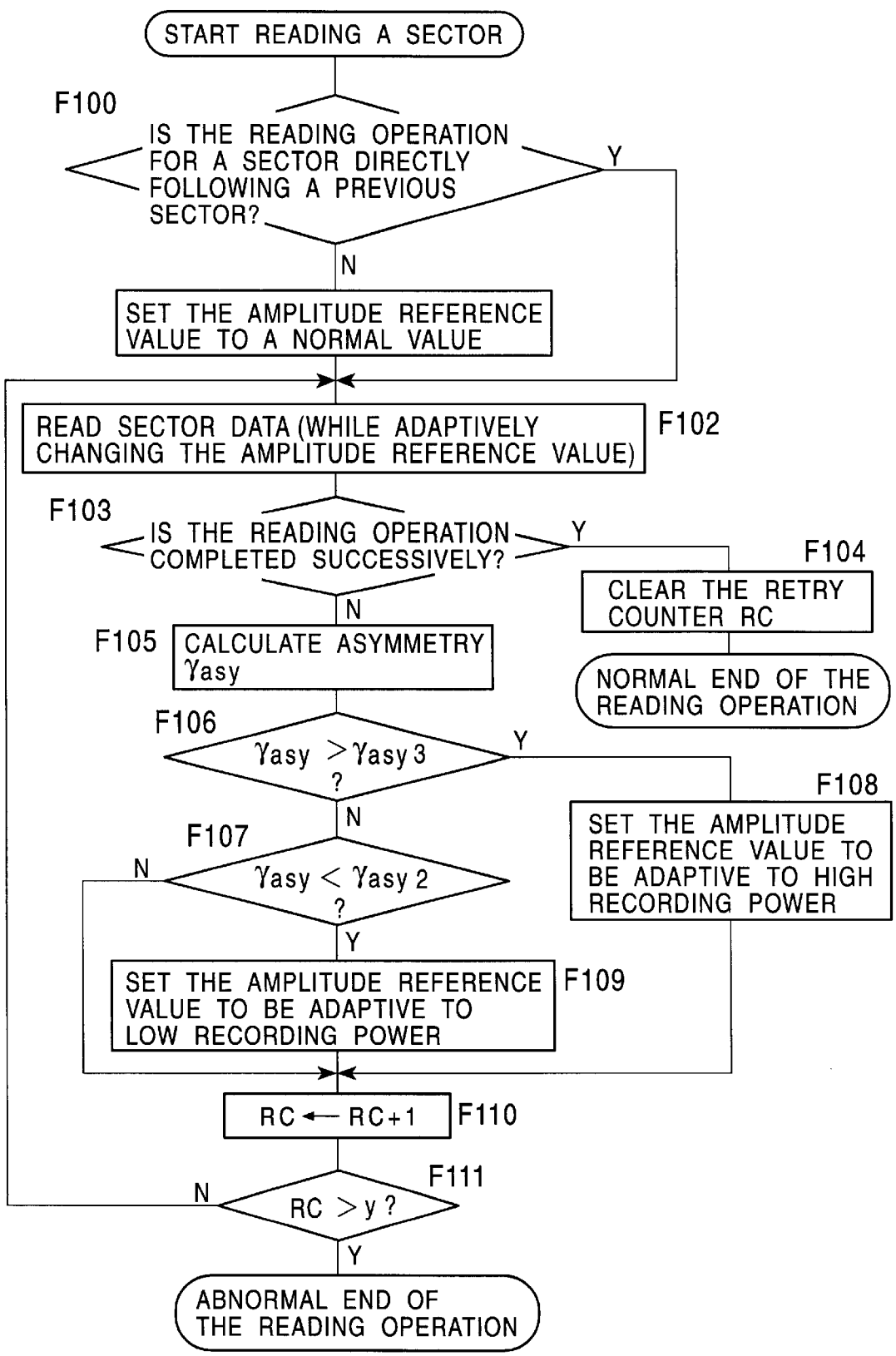
FIG. 20 is a flow chart illustrating a reproducing process according to an embodiment of the invention.

The process is similar to that shown in FIG. 19 or 20 except for the method of determining whether or not the recording laser power is adequate.

Steps corresponding to steps F105, F106, and F107 are performed using the amplitude value of the reproduced RF signal.

The amplitude may be calculated as follows.

As with the degree of asymmetry, the amplitude of the RF signal can also be determined from the adapted amplitude reference values.

That is, in FIG. 17, a minimum amplitude pattern is given by the 2T pattern, and a maximum amplitude pattern is given by the 8T pattern. When the maximum amplitude pattern is given by the 8T pattern (the maximum amplitude can also be obtained from a pattern other then the 8T pattern), the amplitude AMP of the reproduced RF signal is given by:

$$AMP = c111 - c000 \tag{28}$$

Instead of the amplitude of the reproduced RF signal, the amplitude VFO of the 2T pattern corresponding to the size of the open area of the eye pattern may be used to estimate the recording laser power. In this case, the amplitude VFO may be given by $$VFO = ((c011 + c110) - (c001 + c100))/2 \tag{29}$$

Thus, the CPU (controller 2) may calculate the amplitude (AMP or VFO) by acquiring the amplitude reference values updated by the RAA 136.

Then the controller 2 may estimate the recording laser power associated with the reproduced RF signal from the calculated amplitude.

Figure 18:
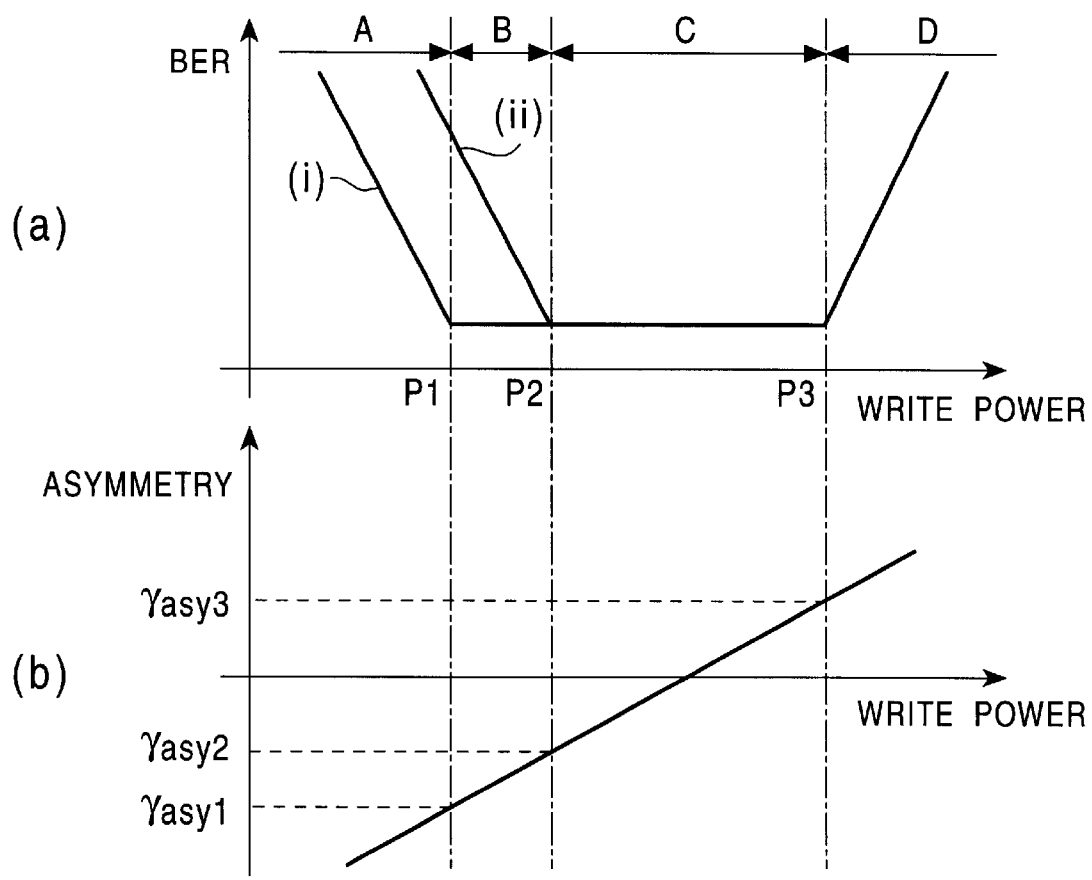
FIG. 18 illustrates a range of asymmetry allowable in an embodiment of the invention.

Although not shown in the figure, the amplitude AMP (also the amplitude VFO) has a proportional relationship with the recording laser power, similar to that shown in FIG. 18 (if the degree of asymmetry in FIG. 18 is replace with the amplitude AMP, the relationship is obtained).

As described above, the recording laser power level can be estimated from the amplitude of the reproduced RF signal, and the amplitude reference values can be adaptively changed during the retrying operation as described earlier with reference to FIGS. 19 and 20.

The amplitude of the reproduced RF signal may also be determined from sampled values of the envelope of the RF signal.

In this case, the peak and the bottom of the amplitude of the RF signal are detected, and a calculation corresponding to equation (28) is performed.

The calculation of the amplitude of the RF signal may be applied not only to alloy-type WORM disks but also to a wide variety of disk drives which use a medium having a correlation between the recording laser power and the amplitude of a signal.

What is claimed is:

1. A drive device comprising:

head means for reading a data signal recorded on a recording medium by illuminating said recording medium with a laser beam;

decoding means for performing a Viterbi decoding process upon the data signal read by said head means;

determining means for determining, from the data signal read by said head means, whether or not the recording laser power used to record said data signal is adequate; and control means for controlling a reproducing operation such that when said decoding means fails to correctly reproduce data from the data signal read by said head means, if said determining means determines that the recording laser power associated with said data signal is inadequate, the reproducing operation is retried after changing an amplitude reference value used in said Viterbi decoding process.

2. A drive device according to claim 1, wherein said determining means calculates the degree of asymmetry of the waveform of the data signal read by said head means and determines the adequacy of the recording laser power on the basis of said degree of asymmetry.

3. A drive device according to claim 2, wherein said determining means determines the adequacy of the recording laser power depending on whether or not the calculated degree of asymmetry is within a predetermined range.

4. A drive device according to claim 1, wherein said determining means detects the amplitude of the waveform of the data signal read by said head means and determines the adequacy of the recording laser power on the basis of said amplitude.

5. A drive device according to claim 1, wherein said decoding means includes amplitude reference value adapting means for adapting the amplitude reference value used in the Viterbi decoding process during a reproducing operation so that the amplitude reference value becomes optimum for the supplied data signal.

6. A drive device according to claim 1, wherein said determining means sets said amplitude reference value to a predetermined initial value before the operation of reproducing data from one or more regions of said recording medium is started.

7. A drive device according to claim 6, wherein said control means controls the reproducing operation such that when the operation of reproducing data from a region on said recording medium is started immediately after completion of reproducing data from a previous region on said recording medium, the current amplitude reference value is used in the Viterbi decoding process.

* * * * *

UNITED STATES PATENT AND TRADEMARK OFFICE
CERTIFICATE OF CORRECTION

PATENT NO. : 6,721,254 B1
DATED : April 13, 2004
INVENTOR(S) : Shigeo Yamaguchi

It is certified that error appears in the above-identified patent and that said Letters Patent is hereby corrected as shown below:

Column 9,
Line 22, change "b[j=0" to -- b[j]=0 --;

Column 10,
Line 12, change "f or" to -- for --;

Column 13,
Line 67, delete "receives"

Signed and Sealed this

Twenty-eighth Day of December, 2004

JON W. DUDAS
*Director of the United States Patent and Trademark Office*